United States Patent
Wallach

(10) Patent No.: US 8,410,622 B1
(45) Date of Patent: Apr. 2, 2013

(54) VERTICAL AXIS WIND TURBINE WITH COMPUTER CONTROLLED WINGS

(76) Inventor: Christopher S. Wallach, Green Cove Springs, FL (US)

( * ) Notice: Subject to any disclaimer, the term of this patent is extended or adjusted under 35 U.S.C. 154(b) by 670 days.

(21) Appl. No.: 12/462,551

(22) Filed: Aug. 5, 2009

Related U.S. Application Data

(60) Provisional application No. 61/188,395, filed on Aug. 6, 2008.

(51) Int. Cl.
*F03D 9/00* (2006.01)
*H02P 9/04* (2006.01)

(52) U.S. Cl. .......................................... 290/44

(58) Field of Classification Search ............... 290/44, 290/55; 415/4.2, 4.1, 4.3, 4.5, 2.1; 416/117
See application file for complete search history.

(56) References Cited

U.S. PATENT DOCUMENTS

| | | | |
|---|---|---|---|
| 3,730,643 A | 5/1973 | Davison | |
| 3,902,072 A * | 8/1975 | Quinn | ............... 290/44 |
| 4,052,134 A | 10/1977 | Rumsey | |
| 4,129,787 A | 12/1978 | Palma | |
| 4,168,439 A | 9/1979 | Palma | |
| 4,303,834 A | 12/1981 | Li | |
| 4,303,835 A | 12/1981 | Bair | |
| 4,368,392 A | 1/1983 | Drees | |
| 4,410,806 A | 10/1983 | Brulle | |
| 4,530,642 A | 7/1985 | Yang | |
| 4,546,264 A | 10/1985 | Pinson | |
| 4,589,344 A | 5/1986 | Davison | |
| 4,832,569 A | 5/1989 | Samuelsen et al. | |
| 5,503,525 A | 4/1996 | Brown et al. | |
| 6,244,919 B1 | 6/2001 | Valentini | |
| 6,379,115 B1 * | 4/2002 | Hirai | ............... 416/17 |
| 6,672,522 B2 | 1/2004 | Lee et al. | |
| 6,884,020 B2 | 4/2005 | Kaare, Jr. et al. | |
| 2007/0041837 A1 * | 2/2007 | Ide et al. | ............... 416/147 |
| 2007/0243066 A1 | 10/2007 | Baron | |
| 2008/0298963 A1 * | 12/2008 | Egedal | ............... 416/31 |
| 2008/0311765 A1 * | 12/2008 | Chatterjee et al. | ............... 439/38 |
| 2009/0069956 A1 * | 3/2009 | Taya et al. | ............... 701/2 |
| 2009/0187282 A1 * | 7/2009 | Menke et al. | ............... 700/287 |

FOREIGN PATENT DOCUMENTS

| | | |
|---|---|---|
| CN | 1858438 | 11/2006 |
| FR | 2845428 | 4/2004 |
| JP | 2002214346 A * | 7/2002 |

* cited by examiner

*Primary Examiner* — Julio Gonzalez
(74) *Attorney, Agent, or Firm* — Robert M. Hunter

(57) ABSTRACT

An apparatus and method for extracting power from a moving fluid, such as the wind. In an illustrative embodiment, the invention is a vertical axis wind turbine with variable-pitch wings, each turned directly by a servomotor under the control of an on-board computer. The computer is continuously updated from onboard transducers which measure wind direction, wind speed, rotor assembly position and rotor assembly speed and calculates each wing's optimum angle of attack at all times and under all conditions. This angle is then sent as a command to each wing's servomotor and the computer executes the control loop again.

26 Claims, 13 Drawing Sheets

VERTICAL AXIS WIND TURBINE WITH COMPUTER CONTROLLED WINGS

CROSS-REFERENCE TO RELATED APPLICATIONS

This application claims the benefit of U.S. Provisional Patent Application No. 61/188,395, filed Aug. 6, 2008, the disclosure of which patent application is incorporated by reference as if fully set forth herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

This invention relates to a system and method for extracting energy from a moving fluid. In particular, the invention relates to a Vertical Axis Wind Turbine (VAWT) with variable pitch vertical wings that are under computer control.

The background art is characterized by U.S. Pat. Nos. 3,730,643; 3,902,072; 4,052,134; 4,129,787; 4,168,439; 4,303,834; 4,303,835; 4,368,392; 4,410,806; 4,530,642; 4,546,264; 4,589,344; 4,832,569; 5,503,525; 6,244,919; 6,379,115; 6,672,522; 6,884,020; and by U.S. Patent Application No. 2007/0243066; the disclosures of which patents and patent application are incorporated by reference as if fully set forth herein. The background art is also characterized by France Patent No. 2845428 and China Patent No. 1858438.

What is needed is a system and method that optimizes the ability of a VAWT to achieve a maximum achievable coefficient of power, on a millisecond by millisecond basis, regardless of instantaneous wind speed and instantaneous wind direction.

BRIEF SUMMARY OF THE INVENTION

One purpose of the invention is to improve the overall efficiency of wind energy conversion across a full spectrum of wind conditions. Another purpose is to allow wind energy conversion systems to be used on more sites. At present, only excellent sites are economically viable and these sites are frequently distant from population centers. Another purpose is to make wind turbines more practical for home use.

In an illustrative embodiment, the invention is a more efficient way to extract power from a moving fluid, e.g., the wind or flowing water. In another illustrative embodiment, the invention is a VAWT device with variable-pitch wings or blades, each turned directly by a servomotor under the control of a small on-board computer. In this embodiment, the computer is continuously updated from onboard transducers which measure wind direction, wind speed, wing direction, rotor assembly position and rotor assembly speed. This allows the computer to calculate each wing or blade's optimum angle of attack at all times and under all conditions. This angle is then sent as a command to each wing or blade's individual servomotor and the computer executes the control loop again. This control loop preferably executes at least 50 times per second (and preferably about 250 to 500 times a second), faster, in fact, than the servomotors can fully respond. The variable-pitch blade has now become a "smart" blade.

In another illustrative embodiment, the invention is a vertical axis wind turbine for extracting energy from wind having a direction, said vertical axis wind turbine comprising: a tower; a shaft that is mounted in said tower; a rotor assembly that is attached to said shaft, said rotor assembly comprising at least one spoke; at least one wing or blade that is pivotably attached to each said at least one spoke, each at least one wing or blade having a chord line and an angle of attack; a servomotor that is attached to each said at least one wing or blade and to each said at least one spoke, each said servomotor being operative to adjust the orientation of each said at least one wing or blade relative to said at least one spoke; a plurality of sensors (transducers) that measure a wind direction, a wind speed, a direction of said at least one wing or blade (wing direction), a speed of said at least one wing or blade (wing speed), a rotor assembly position and a rotor assembly speed and produce output signals; and a computer that is operative to iteratively accept said output signals and send an input signal to each said servomotor to change said angle of attack of each said at least one wing or blade so as to maximize the power output of the vertical axis wind turbine; wherein said angle of attack is an angle between said chord line and the direction of the apparent wind. Preferably, the vertical axis wind turbine further comprises: more than one said wind or blade (a plurality of said wings or blades); and a plurality of said servomotors. Preferably, said computer is operative to accept (read) said output signals and send said input signal at least 50 times per second.

In another illustrative embodiment, the vertical axis wind turbine further comprises: at least two spokes; wherein each said at least one wing is supported at its top and at its bottom by one of said at least two spokes and each said servomotor is disposed adjacent either at said top or said bottom. Preferably, each said at least one wing is supported at its midpoint by a single spoke and each said servomotor is disposed adjacent said midpoint. Preferably, said tower is at least ten meters tall.

In another illustrative embodiment, the vertical wind turbine further comprises: a slip ring or an induction coil for transmitting power to each said servo motor and said computer and/or a slip ring or a wireless communication link for communication between said plurality of sensors and each said servomotor and said computer. Preferably, each said servomotor is a right angle gear head servomotor or a stepper motor.

In another illustrative embodiment, the vertical wind turbine further comprises: a generator that is attached to said shaft. Preferably, said generator is selected from the group consisting of: a high speed, brushless, rectified alternating current, indirect drive generator with a speed increasing transmission mounted beside said tower; and a low speed, axial flux, brushless, rectified alternating current, direct drive generator mounted at the top of said tower and beneath said rotor assembly. Preferably, the generator is driven directly by the rotor's main shaft.

In another illustrative embodiment, the vertical wind turbine further comprises: a power supply, said power supply supplying power to each of said servomotors, as well as the sensors, controller/drivers, computer, or any other part of the invention requiring power. Preferably, said power supply is selected from the group consisting of: a chemical battery and a capacitor. Preferably, said plurality of sensors comprises a wind speed sensor that is selected from the group consisting of: a tachometer generator with a revolutions per minute output; an analog, non-contacting anemometer with a first position output; a digital, non-contacting anemometer with a second position output; a hot wire, analog anemometer with a speed output; and an ultrasonic analog or digital anemometer with a speed output. In this embodiment, the position sensors are both azimuth sensors, and the computer uses the difference between two consecutive position readings and the elapsed time to determine speed. Preferably, said plurality of sensors comprises a wind speed sensor that is located on a rotating or non-rotating mast that is disposed above said rotor assembly, on a rotating or non-rotating hub that is attached to said tower beneath said rotor assembly, or on said at least one spoke or an extension to said at least one spoke. Preferably, said plurality of sensors comprises a wind speed sensor that receives regulated operating power from said computer. Preferably, said plurality of sensors comprises a wind azimuth sensor that is selected from the group consisting of: an analog, non-contacting wind azimuth sensor with a first position output; and a digital, non-contacting wind azimuth sensor with a second position output. Preferably, said plurality of sensors comprises a wind azimuth sensor that is located on a rotating or non-rotating mast that is disposed above said rotor assembly, on a rotating or non-rotating hub that is attached to said tower beneath said rotor assembly, or on said at least one spoke or an extension to said at least one spoke.

In another illustrative embodiment, said plurality of sensors comprises a wind azimuth sensor that receives regulated operating power from said computer. Preferably, said plurality of sensors comprises a rotor azimuth sensor that is selected from the group consisting of: an analog, non-contacting rotor azimuth sensor with a first position output; and a digital, non-contacting rotor azimuth sensor with a second position output. Preferably, said plurality of sensors comprises a rotor azimuth sensor that is located on said rotor assembly with an input shaft attached to said tower or in said tower. Preferably, said plurality of sensors comprises a rotor azimuth sensor that receives regulated operating power from said computer. Preferably, said plurality of sensors comprises a wing azimuth sensor that is selected from the group consisting of: an analog, non-contacting wing azimuth sensor with a first position output; and a digital, non-contacting wing azimuth sensor with a second position output. Preferably, said plurality of sensors comprises a wing azimuth sensor that is located on said at least one spoke. Preferably, said plurality of sensors comprises a wing azimuth sensor that receives regulated operating power from said computer.

In another illustrative embodiment, the vertical wind turbine further comprises: a wing motor controller/driver that is associated with each at least one wing that receives power from said computer or said power supply. Preferably, said computer is a microcomputer or a microcontroller. Preferably, said tower is a monopole having a composite construction.

In yet another illustrative embodiment, the invention is a process for operating a vertical wind turbine in a wind having a direction and a speed, said vertical wind turbine having a rotor assembly having a rotor assembly radius and a wing, said process comprising: exposing the wing to the wind, the wing being disposed at an orientation relative to said rotor assembly radius; measuring the direction and the speed of the wind by means of one or more sensors disposed on said rotor assembly and an angular position and a speed of said rotor assembly to produce output signals; at intervals, computing an angle of attack of the wing that will maximize wind turbine power output based on said output signals to determine a desired angle of attack; and at intervals, adjusting said orientation to move said wing closer to said desired angle of attack. Preferably, each of said intervals is at most one 50th of a second.

In another illustrative embodiment, the invention is a wind energy conversion device that comprises: a stationary horizontal base; a hollow main shaft that is rotatable in bearings that are mounted on (preferably in the middle of) said stationary horizontal base, said hollow main shaft extending above and below said stationary horizontal base; a main shaft hub that is mounted on said main shaft, said main shaft hub being rotatable (preferably in a clockwise direction when viewed from its upper side) relative to said stationary horizontal base; a lower rotor hub that is attached to said main shaft hub by means of a main shaft torque sensor; a plurality of substantially horizontal lower wing spokes that are attached to said lower rotor hub (with there being as many horizontal lower wing spokes as there are wing assemblies to be mounted on said lower rotor hub); a stationery rotor azimuth rod that is (preferably fixed to a bracket that is) mounted on (preferably the lower side of) said stationary horizontal base, said stationary rotor azimuth rod extending vertically upward through said hollow main shaft and protruding from the top of said hollow main shaft; a rotor azimuth sensor that is disposed inside said hollow main shaft, said rotor azimuth sensor having a center shaft that is attached to said stationary rotor azimuth rod and (preferably having a housing that is) attached to (preferably the center of) said lower rotor hub; a control system assembly having a computer and a battery that is mounted to said lower rotor hub; a vertical rotor center tube that is mounted on said lower rotor hub or on the top of said lower rotor hub enclosure; an upper rotor hub mounted on the upper end of the vertical rotor center tube; a plurality of horizontal upper wing spokes that are mounted on said upper rotor hub (as many horizontal upper wing spokes as there are wing assemblies to be mounted on said upper rotor hub); a wing assembly that is attached to the end of each lower wing spoke and upper wing spoke, each wing assembly comprising a wing and wing bearings and each wing comprising a high-strength foam core and carbon/fiber reinforced epoxy with an end plate that is bonded to each end of each said wing; an (preferably internal) wing tube that is bonded to said foam core and extends beyond each end plate; a lower wing tube bearing that supports the lower end of said wing tube and it is mounted in a lower wing bearing flange that is attached to the of end of each lower each wing spoke; an upper wing tube bearing that supports the upper end of said wing tube and is mounted in an upper wing bearing flange that is attached to the of end of each top wing spoke; a servo module that is attached to said upper wing spoke, said servo module having a rotatable shaft that is attached to a portion of said wing tube that extends beyond said upper wing tube bearing; a power supply (e.g., a battery, a capacitor and/or an induction coil/generator combination) that is mounted on said lower rotor hub and that powers said computer and said servo module; a lower rotor hub enclosure that encloses and protects said rotor azimuth sensor, said computer and said power supply; a vertical sensor mast that is attached to said upper rotor hub; a wind speed sensor that is mounted on said sensor mast and produces wind speed readings, with said computer correcting said wind speed readings for the speed at which said upper rotor hub is rotating; and a wind azimuth sensor (e.g., a wind direction transducer) that is also mounted on said sensor post and produces wind direction readings, with said computer being operative to correct said wind direction readings for the orientation of the upper rotor hub, if necessary. In an alternative embodiment, the main shaft hub is connected directly to or comprises (e.g., is integral with) the lower rotor hub and the vertical rotor center tube is an extension of the main shaft and other means are used to measure the power output by the device.

In an illustrative embodiment, the source of power for the computer, sensors, motors, and motor drivers/controllers is a 12 volt battery that is charged by the wind turbine generator. This battery is preferably located at the base of the tower where it can be re-charged by automotive jumper cables in an emergency. Battery power is preferably distributed to the moving rotor via an induction coil or slip ring, where it maintains a charge on a storage capacitor. In this embodiment, the storage capacitor acts as a power supply that is kept charged by a storage battery which is itself kept charged by the turbine generator.

In another illustrative embodiment, the invention is a process for operating a vertical wind turbine in a wind having a direction and a speed, said vertical wind turbine having a rotor, assembly having a rotor assembly radius and a wing, said process comprising: exposing the wing to the wind, the wing being disposed at an orientation relative to the rotor assembly radius; measuring the direction and the speed of the wind by means of one or more sensors disposed on said rotor assembly and an angular position and a speed of said rotor assembly to produce output signals; at intervals, computing an angle of attack of the wing that will maximize wind turbine power output based on said output signals to determine a desired angle of attack; and at intervals, adjusting said orientation to move said wing closer to said desired angle of attack. In some embodiments, each of said intervals is at most one 50th of a second.

In another illustrative embodiment, the invention is a process for operating a vertical wind turbine in a wind having a direction and a speed, said vertical wind turbine having a rotor assembly having a rotor assembly radius and a wing, said process comprising: a step for exposing the wing to the wind, the wing being disposed at an orientation relative to the rotor assembly radius; a step for measuring the direction and the speed of the wind by means of one or more sensors disposed on said rotor assembly and an angular position and a speed of said rotor assembly to produce output signals; a step for, at intervals, computing an angle of attack of the wing that will maximize wind turbine power output based on said output signals to determine a desired angle of attack; and a step for, at intervals, adjusting said orientation to move said wing closer to said desired angle of attack.

In another preferred embodiment, the invention is a system for operating a vertical wind turbine in a wind having a direction and a speed, said vertical wind turbine having a rotor assembly having a rotor assembly radius and a wing, said system comprising: means for exposing the wing to the wind, the wing being disposed at an orientation relative to the rotor assembly radius; means for measuring the direction and the speed of the wind by means of one or more sensors disposed on said rotor assembly and an angular position and a speed of said rotor assembly to produce output signals; means for, at intervals, computing an angle of attack of the wing that will maximize wind turbine power output based on said output signals to determine a desired angle of attack; and means for, at intervals, adjusting said orientation to move said wing closer to said desired angle of attack.

In another illustrative embodiment, the invention is a wind energy conversion device that comprises: a stationary horizontal base; a hollow main shaft that is rotatable in bearings that are mounted on said stationary horizontal base, said hollow main shaft extending above and below said stationary horizontal base; a main shaft hub that is mounted on said main shaft, said main shaft hub being rotatable relative to said stationary horizontal base; a lower rotor hub that is attached to said main shaft hub by means of a main shaft torque sensor; a plurality of substantially horizontal lower wing spokes that are attached to said lower rotor hub; a stationery rotor azimuth rod that is mounted on said stationary horizontal base, said stationary rotor azimuth rod extending vertically upward through said hollow main shaft and protruding from the top of said hollow main shaft; a rotor azimuth sensor that is disposed inside said hollow main shaft, said rotor azimuth sensor having a center shaft that is attached to said stationary rotor azimuth rod and attached to said lower rotor hub; a control system assembly having a computer and a battery that is mounted to said lower rotor hub; a vertical rotor center tube that is mounted on said lower rotor hub or on the top of said lower rotor hub enclosure; an upper rotor hub mounted on the upper end of the vertical rotor center tube; a plurality of horizontal upper wing spokes that are mounted on said upper rotor hub; a wing assembly that is attached to the end of each lower wing spoke and upper wing spoke, each wing assembly comprising a wing and wing bearings and each wing comprising a high-strength foam core and carbon/fiber reinforced epoxy with an end plate that is bonded to each end of each said wing; a wing tube that is bonded to said foam core and extends beyond each end plate; a lower wing tube bearing that supports the lower end of said wing tube and is mounted in a lower wing bearing flange that is attached to the of end of each lower wing spoke; an upper wing tube bearing that supports the upper end of said wing tube and is mounted in an upper wing bearing flange that is attached to the end of each top wing spoke; a servo module that is attached to said upper wing spoke, said servo module having a rotatable shaft that is attached to a portion of said wing tube that extends beyond said upper wing tube bearing; a power supply that is mounted on said lower rotor hub and that powers said computer and said servo module; a lower rotor hub enclosure that encloses and protects said rotor azimuth sensor, said computer and said power supply; a vertical sensor mast that is attached to said upper rotor hub; a wind speed sensor that is mounted on said sensor mast and produces wind speed readings, with said computer being operative to correct said wind speed readings for the speed at which said upper rotor hub is rotating; and a wind azimuth sensor that is also mounted on said sensor post and produces wind direction readings, with said computer correcting said wind direction readings for the orientation of the upper rotor hub, if necessary. In some embodiments, said main shaft hub is connected directly to or is integral with said lower rotor hub, and said vertical rotor center tube is an extension of said main shaft.

In another illustrative embodiment, the invention is a process for using a turbine to extract energy from a moving fluid, said process comprising: at desired time intervals, reading sensor inputs that characterize turbine operating parameters and environmental parameters to produce sensor readings; converting said sensor readings into engineering units to produce current turbine operating data comprising a torque value, a ground referenced rotor azimuth value, a spoke-tip referenced wing azimuth value, a rotor referenced moving fluid azimuth value, and a rotor referenced moving fluid sensor speed of rotation value; determining a current rotor speed of rotation value using a pair of said ground referenced rotor azimuth values and an elapsed time; correcting said rotor referenced moving fluid sensor speed of rotation value to produce a ground referenced moving fluid speed sensor speed of rotation value; converting said ground referenced moving fluid speed sensor speed of rotation value into a moving fluid speed value; converting said rotor referenced moving fluid azimuth value into a ground referenced moving fluid direction value; creating a spoke-tip referenced wing azimuth scale (that is fixed to the tip of the spokes at a right angle so that its origin or zero degree mark faces the spoke tip's direction of travel); creating a movable moving fluid direction degree scale that is referenced to said ground referenced moving fluid direction value (said movable moving fluid direction degree scale being a virtual scale in that it is not read directly from any sensor and always has its origin or zero degree mark facing into the instantaneous true wind); referencing said ground referenced rotor azimuth value and said spoke-tip referenced wing azimuth scale to said moving fluid direction degree scale to produce a current moving fluid azimuth value on said spoke-tip referenced wing azimuth scale (the wing's direction of motion, which is tangent to the rotor's circumference, and the wing's speed, which is the rotor's circumferential speed, being needed to construct an apparent wind triangle); determining an apparent moving fluid azimuth (by solving the apparent wind triangle based on the wing's direction of rotation always being zero on the wing azimuth scale, the wing's speed being known from the rotor RPM and spoke length, the true wind direction on the wing azimuth scale being known and the true wind speed being known); determining a desired angle of attack using said apparent moveable fluid azimuth, said current rotor speed of rotation value, a desired rotor speed of rotation, and a maximum lift attack angle; modifying said desired angle of attack if said current rotor speed of rotation value is above or below a selected value; calculating a speed and direction command to send to a wing rotation mechanism; converting said speed and direction command into an appropriate command format to produce a formatted speed and direction command; transmitting said formatted speed and direction command to said wing rotation mechanism; storing said current wing azimuth and said current rotor azimuth; and storing said current turbine operating data.

In another illustrative embodiment, the invention is a process for using a turbine having a wind and a wing rotation mechanism to extract energy from a moving fluid (e.g., wind), said process comprising: at desired time intervals, reading sensor inputs that characterize turbine operating parameters and environmental parameters to produce sensor readings; converting said sensor readings into engineering units to produce current turbine operating data comprising a torque value, a ground referenced rotor azimuth value, a spoke-tip referenced wing azimuth value, a rotor referenced moving fluid (e.g., wind) azimuth value, and a rotor referenced moving fluid (e.g., wind) sensor speed of rotation value; determining a current rotor speed of rotation value using a pair of ground referenced rotor azimuth values and elapsed time; correcting said rotor referenced moving fluid sensor speed of rotation value to produce a ground referenced moving fluid speed sensor speed of rotation value; converting said ground referenced moving fluid speed sensor speed of rotation value into a moving fluid speed value; converting said rotor referenced moving azimuth value into a ground referenced moving fluid direction value; creating a movable moveable fluid direction degree scale that is referenced to said ground referenced moveable direction value; referencing said ground referenced rotor azimuth value, said spoke-tip referenced wing azimuth value and said rotor referenced moveable fluid azimuth value to said movable moving fluid direction degree scale to produce a current wing azimuth and a current rotor azimuth; determining an apparent moveable fluid azimuth; determining a desired angle of attack using said apparent moveable fluid azimuth, said current rotor speed of rotation value, a desired rotor speed of rotation, and a maximum lift attack angle; modifying said desired angle of attack if said current rotor speed of rotation value (e.g., rotor revolutions per minute or RPM) is above or below a selected value; calculating a speed and direction command to send to a wing rotation mechanism; converting said speed and direction command into an appropriate command format to produce a formatted speed and direction command; transmitting said formatted speed and direction command to the wing rotation mechanism; storing said current wing azimuth and said current rotor azimuth; and storing said current turbine operating data.

In yet another illustrative embodiment, the invention is a process for using a turbine having a wing and a wing rotation mechanism to extract energy from a moving fluid, said process comprising: at a desired time interval, reading sensor inputs that characterize turbine operating parameters and environmental parameters to produce sensor readings; converting said sensor readings into current turbine operating data comprising a torque value, a ground referenced rotor azimuth value, a spoke-tip referenced wing azimuth value, a rotor referenced moving fluid azimuth value, and a rotor referenced moving fluid sensor speed of rotation value; determining a current rotor speed of rotation value using a pair of said ground referenced rotor azimuth values and an elapsed time; correcting said rotor referenced moving fluid sensor speed of rotation value to produce a ground referenced moving fluid speed sensor speed of rotation value; converting said ground referenced moving fluid speed sensor speed of rotation value into a moving fluid speed value; converting said rotor referenced moving fluid azimuth value into a ground referenced moving fluid direction value; creating a spoke-tip referenced wing azimuth scale; creating a movable moving fluid direction degree scale that is referenced to said ground referenced moving fluid direction value; referencing said ground referenced rotor azimuth value and said spoke-tip referenced wing azimuth scale to said moving fluid direction degree scale to produce a current moving fluid azimuth value on said spoke-tip referenced wing azimuth scale; determining an apparent moving fluid azimuth; determining a desired angle of attack using said apparent moving fluid azimuth, said current rotor speed of rotation value, a desired rotor speed of rotation, and a maximum lift attack angle; modifying said desired angle of attack if said current rotor speed of rotation value is above or below a selected value; calculating a speed and direction command to send to a wing rotation mechanism; transmitting said speed and direction command to the wing rotation mechanism; and storing said current wing azimuth and said current rotor azimuth.

In yet another illustrative embodiment, the invention is a process for using a turbine having a wing and a wing rotation mechanism to extract energy from a moving fluid, said process comprising: a step for, at desired time intervals, reading sensor inputs that characterize turbine operating parameters and environmental parameters to produce sensor readings; a step for converting said sensor readings into current turbine operating data comprising a torque value, a ground referenced rotor azimuth value, a spoke-tip referenced wing azimuth value, a rotor referenced moving fluid azimuth value, and a rotor referenced moving fluid sensor speed of rotation value; a step for determining a current rotor speed of rotation value using a pair of said ground referenced rotor azimuth values and an elapsed time; a step for correcting said rotor referenced moving fluid sensor speed of rotation value to produce a ground referenced moving fluid speed sensor speed of rotation value; a step for converting said ground referenced moving fluid speed sensor speed of rotation value into a moving fluid speed value; a step for converting said rotor referenced moving fluid azimuth value into a ground referenced moving fluid direction value; a step for creating a spoke-tip referenced wing azimuth scale; a step for creating a movable moving fluid direction degree scale that is referenced to said ground referenced moving fluid direction value; a step for referencing said ground referenced rotor azimuth value and said spoke-tip referenced wing azimuth scale to said moving fluid direction degree scale to produce a current moving fluid azimuth value on said spoke-tip referenced wing azimuth scale; a step for determining an apparent moving fluid azimuth; a step for determining a desired angle of attack using said apparent moving fluid azimuth, said current rotor speed of rotation value, a desired rotor speed of rotation, and a maximum lift attack angle; a step for modifying said desired angle of attack if said current rotor speed of rotation value is above or below a selected value; a step for calculating a speed and direction command to send to a wing rotation mechanism; and a step for transmitting said speed and direction command to said wing rotation mechanism; and a step for storing said current wing azimuth and said current rotor azimuth.

In a further illustrative embodiment, the invention is an apparatus for using a turbine having a wing and a wing rotation mechanism to extract energy from a moving fluid, said process comprising: means for, at desired time intervals, reading sensor inputs that characterize turbine operating parameters and environmental parameters to produce sensor readings; means for converting said sensor readings into current turbine operating data comprising a torque value, a ground referenced rotor azimuth value, a spoke-tip referenced wing azimuth value, a rotor referenced moving fluid azimuth value, and a rotor referenced moving fluid sensor speed of rotation value; means for determining a current rotor speed of rotation value using a pair of said ground referenced rotor azimuth values and an elapsed time; means for correcting said rotor referenced moving fluid sensor speed of rotation value to produce a ground referenced moving fluid speed sensor speed of rotation value; means for converting said ground referenced moving fluid speed sensor speed of rotation value into a moving fluid speed value; means for converting said rotor referenced moving fluid azimuth value into a ground referenced moving fluid direction value; means for creating a spoke-tip referenced wing azimuth scale; means for creating a movable moving fluid direction degree scale that is referenced to said ground referenced moving fluid direction value; means for referencing said ground referenced rotor azimuth value and said spoke-tip referenced wing azimuth scale to said moving fluid direction degree scale to produce a current moving fluid azimuth value on said spoke-tip referenced wing azimuth scale; means for determining an apparent moving fluid azimuth; means for determining a desired angle of attack using said apparent moving fluid azimuth, said current rotor speed of rotation value, a desired rotor speed of rotation, and a maximum lift attack angle; means for modifying said desired angle of attack if said current rotor speed of rotation value is above or below a selected value; means for calculating a speed and direction command to send to a wing rotation mechanism; means for transmitting said speed and direction command to the wing rotation mechanism; and means for storing said current wing azimuth and said current rotor azimuth.

In another illustrative embodiment, the invention is a process for using a turbine having a wing and a wing rotation mechanism to extract energy from a moving fluid, said process comprising: at a desired time interval, reading sensor inputs that characterize turbine operating parameters and environmental parameters to produce sensor readings; converting said sensor readings into current turbine operating data comprising a torque value, a ground referenced rotor azimuth value, a spoke-tip referenced wing azimuth value, a rotor referenced moving fluid azimuth value, and a rotor referenced moving fluid sensor speed of rotation value; determining a current rotor speed of rotation value using a pair of said ground referenced rotor azimuth values and an elapsed time; correcting said rotor referenced moving fluid sensor speed of rotation value to produce a ground referenced moving fluid speed sensor speed of rotation value; converting said ground referenced moving fluid speed sensor speed of rotation value into a moving fluid speed value; referencing said ground referenced rotor azimuth value to said rotor referenced moving fluid azimuth value to produce a new rotor azimuth value [said new rotor azimuth value representing the number of angular degrees that the rotor is facing away (displaced) from the moving fluid direction, said moving fluid direction having an assigned value of zero degrees]; referencing said new rotor azimuth value to a spoke-tip referenced wing azimuth sensor (to the internal scale of each spoke-tip referenced wing azimuth sensor, if there are more than one such sensor); determining an apparent moving fluid azimuth; determining a desired angle of attack using said apparent moving fluid azimuth, said current rotor speed of rotation value, a desired rotor speed of rotation, and a maximum lift attack angle; modifying said desired angle of attack if said current rotor speed of rotation value is above or below a selected value; calculating a speed and direction command to send to a wing rotation mechanism; transmitting said speed and direction command to the wing rotation mechanism; and storing said current wing azimuth and said current rotor azimuth.

In yet another preferred embodiment, the invention is a process for using a turbine having a wing and a wing rotation mechanism to extract energy from a moving fluid, said process comprising: a step for, at a desired time interval, reading sensor inputs that characterize turbine operating parameters and environmental parameters to produce sensor readings; a step for converting said sensor readings into current turbine operating data comprising a torque value, a ground referenced rotor azimuth value, a spoke-tip referenced wing azimuth value, a rotor referenced moving fluid azimuth value, and a rotor referenced moving fluid sensor speed of rotation value; a step for determining a current rotor speed of rotation value using a pair of said ground referenced rotor azimuth values and an elapsed time; a step for correcting said rotor referenced moving fluid sensor speed of rotation value to produce a ground referenced moving fluid speed sensor speed of rotation value; a step for converting said ground referenced moving fluid speed sensor speed of rotation value into a moving fluid speed value; a step for referencing said ground referenced rotor azimuth value to said rotor referenced moving fluid azimuth value to produce a new rotor azimuth value; a step for referencing said new rotor azimuth value to a spoke-tip referenced wing azimuth sensor; a step for determining an apparent moving fluid azimuth; a step for determining a desired angle of attack using said apparent moving fluid azimuth, said current rotor speed of rotation value, a desired rotor speed of rotation, and a maximum lift attack angle; a step for modifying said desired angle of attack if said current rotor speed of rotation value is above or below a selected value; a step for calculating a speed and direction command to send to a wing rotation mechanism; a step for transmitting said speed and direction command to the wing rotation mechanism; and a step for storing said current wing azimuth and said current rotor azimuth.

In another illustrative embodiment, the invention is an apparatus for using a turbine having a wing and a wing rotation mechanism to extract energy from a moving fluid, said apparatus comprising: means for, at a desired time interval, reading sensor inputs that characterize turbine operating parameters and environmental parameters to produce sensor readings; means for converting said sensor readings into current turbine operating data comprising a torque value, a ground referenced rotor azimuth value, a spoke-tip referenced wing azimuth value, a rotor referenced moving fluid azimuth value, and a rotor referenced moving fluid sensor speed of rotation value; means for determining a current rotor speed of rotation value using a pair of said ground referenced rotor azimuth values and an elapsed time; means for correcting said rotor referenced moving fluid sensor speed of rotation value to produce a ground referenced moving fluid speed sensor speed of rotation value; means for converting said ground referenced moving fluid speed sensor speed of rotation value into a moving fluid speed value; means for referencing said ground referenced rotor azimuth value to said rotor referenced moving fluid azimuth value to produce a new rotor azimuth value; means for referencing said new rotor azimuth value to a spoke-tip referenced wing azimuth sensor; means for determining an apparent moving fluid azimuth; means for determining a desired angle of attack using said apparent moving fluid azimuth, said current rotor speed of rotation value, a desired rotor speed of rotation, and a maximum lift attack angle; means for modifying said desired angle of attack if said current rotor speed of rotation value is above or below a selected value; means for calculating a speed and direction command to send to a wing rotation mechanism; means for transmitting said speed and direction command to the wing rotation mechanism; and means for storing said current wing azimuth and said current rotor azimuth.

Further aspects of the invention will become apparent from consideration of the drawings and the ensuing description of illustrative embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently illustrative embodiments of the invention. In the drawings.

Figure 1:
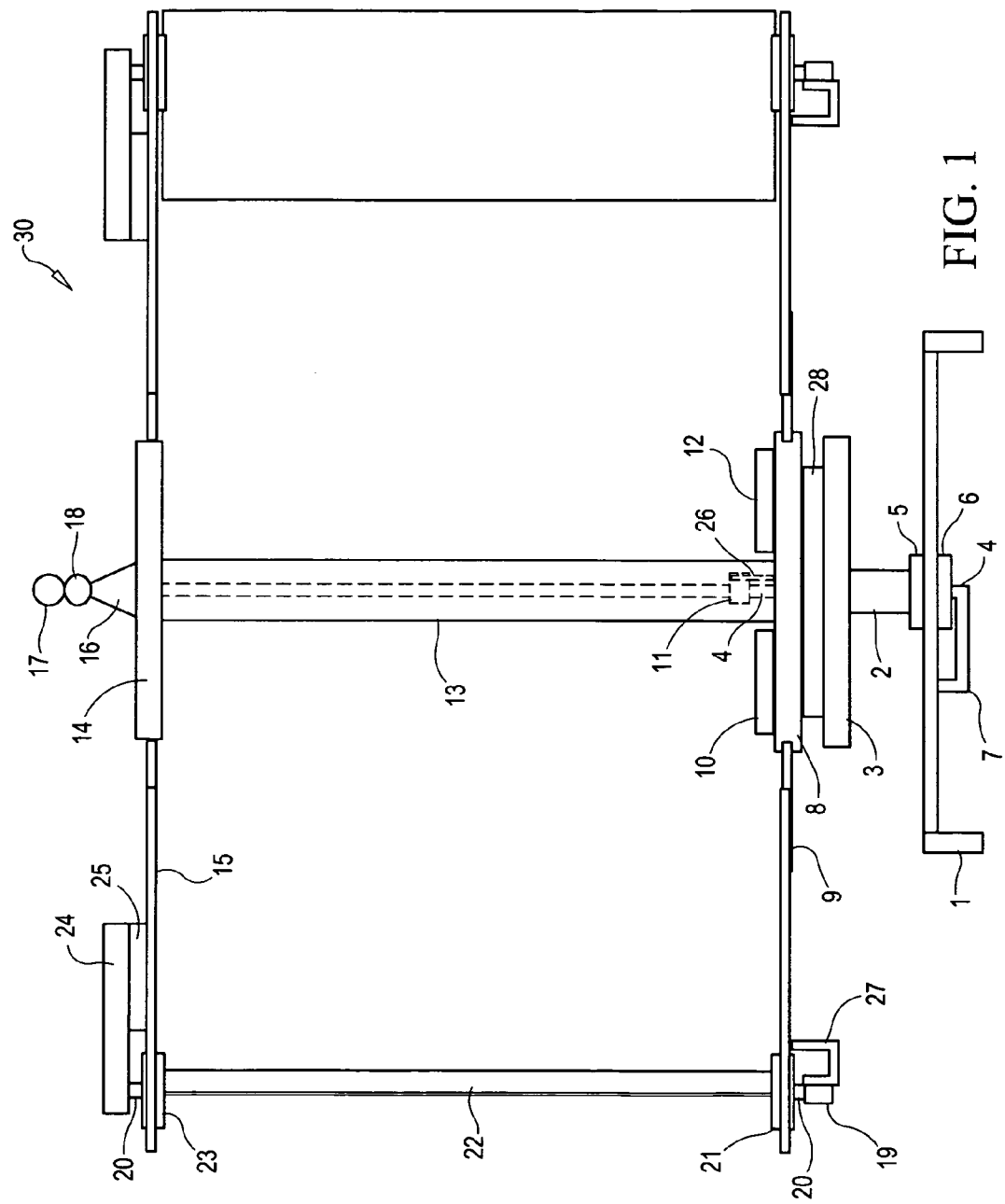
FIG. 1 is an elevation (side) view of an illustrative embodiment of the invention.

The following reference numerals are used to indicate the parts and environment of the invention on the drawings:

1 stationary base, stationary horizontal base
2 main shaft, hollow main shaft
3 main shaft hub
4 stationary rotor azimuth rod
5 main shaft upper bearing
6 main shaft lower bearing
7 rotor azimuth rod bracket
8 lower rotor hub
9 lower wing spoke
10 control system assembly
11 rotor azimuth sensor, rotor azimuth transducer
12 power supply
13 rotor center tube
14 upper rotor hub
15 upper wing spoke
16 sensor mast
17 wind azimuth sensor, true wind azimuth transducer
18 anemometer, wind speed sensor
19 wing azimuth sensor, wing azimuth transducer
20 wing tube
21 lower wing tube bearing
22 wing
23 upper wing tube bearing
24 wing rotation mechanism
25 wing rotation mechanism mount
26 rotor azimuth sensor bracket
27 wing azimuth sensor bracket
28 main shaft torque sensor, main shaft strain gauge
30 wind turbine
32 base assembly
34 rotor assembly, rotor
36 wing assembly
40 read sensor inputs step
42 convert sensor readings step
44 determine rotor rpm step
46 correct anemometer rpm step
48 convert anemometer rpm to wind speed step
50 correct wind azimuth reading step
52 create movable wind direction scale
54 reference readings to movable wind direction degree scale step
56 determine apparent wind azimuth step
58 determine desired angle of attack step
60 modify desired angle of attack step
62 calculate wing motor speed and direction commands step
64 convert wing motor speed and direction commands step
66 transmit formatted wing motor speed and direction commands step
68 store current azimuth data step
70 store current operating data step
72 indirect drive generator 74 direct drive generator
76 tower
78 speed increasing transmission

DETAILED DESCRIPTION OF THE INVENTION

Referring to FIGS. 1-4, an illustrative embodiment of wind turbine 30 is presented. In this embodiment, wind turbine 30 comprises: base assembly 32, rotor assembly 34 and two wing assemblies 36 mounted 180 degrees apart. In the FIG. 1 view, the wind direction is out of the page towards the viewer, and rotor assembly 34 is preferably under the control of a Start Mode algorithm (described below). The wing on the left is oriented in a lift configuration and moving away from the viewer into the wind. The wing on the right is in a drag configuration and moving towards the viewer away from the oncoming wind. For the purposes of this disclosure, the tip speed ratio (TSR) is the ratio of the ground speed of the blade tips and the free wind speed. When the tip speed of turbine assembly 32 exceeds a set (desired or selected) tip speed ratio, the software preferably uses the Run Mode algorithm (described below) which positions the wings as lift devices at all positions. For the purposes of this disclosure, the term "lift device" means a body that creates a lift force. In the context of a fluid flow relative to a body, the lift force is the component of the aerodynamic force that is perpendicular to the flow direction. It contrasts with the drag force, which is the parallel component of the aerodynamic force.

If a wing on a vertical axis wind turbine creates lift force, this force is always at right angles to its apparent wind. Since the wing is mounted on the circumference of a hub, a component of the lift it creates pulls it around this circumference. Since the wing is attached to a spoke on a hub, torque is created on the hub's main shaft as the wing tugs itself around in a circle. This type of VAWT is classified as a lift-type device. Another type of VAWT, such as the Savonius wind turbine, uses curved blades, not wings, to create torque. These blades do not generate lift, only drag, and these turbines are classified as drag-type devices. Drag-type turbines operate at nowhere near the co-efficient of power that lift-type turbines have, but are self starting and make good torque at tip speed ratios below 1.0. Wind turbine 30 is preferably configured solely as a lift-type device and has minimal utility at TSRs below 1.0, and may not even reliably self-start; especially a two winged embodiment. Because wind turbine 30 has full control of instantaneous wing pitch, for startup purposes, it is preferred to put the downwind wing broadside to the wind and use it as a drag device, not as a wing creating lift, and use the upwind wing as a proper wing to create lift. In an illustrative embodiment, at some point when the rotor has enough RPM, the software transitions the wing pitches so that wind turbine 30 becomes a full lift-type VAWT. In Startup Mode, operation as a half-lift, half-drag type of VAWT is preferred.

Figure 2:
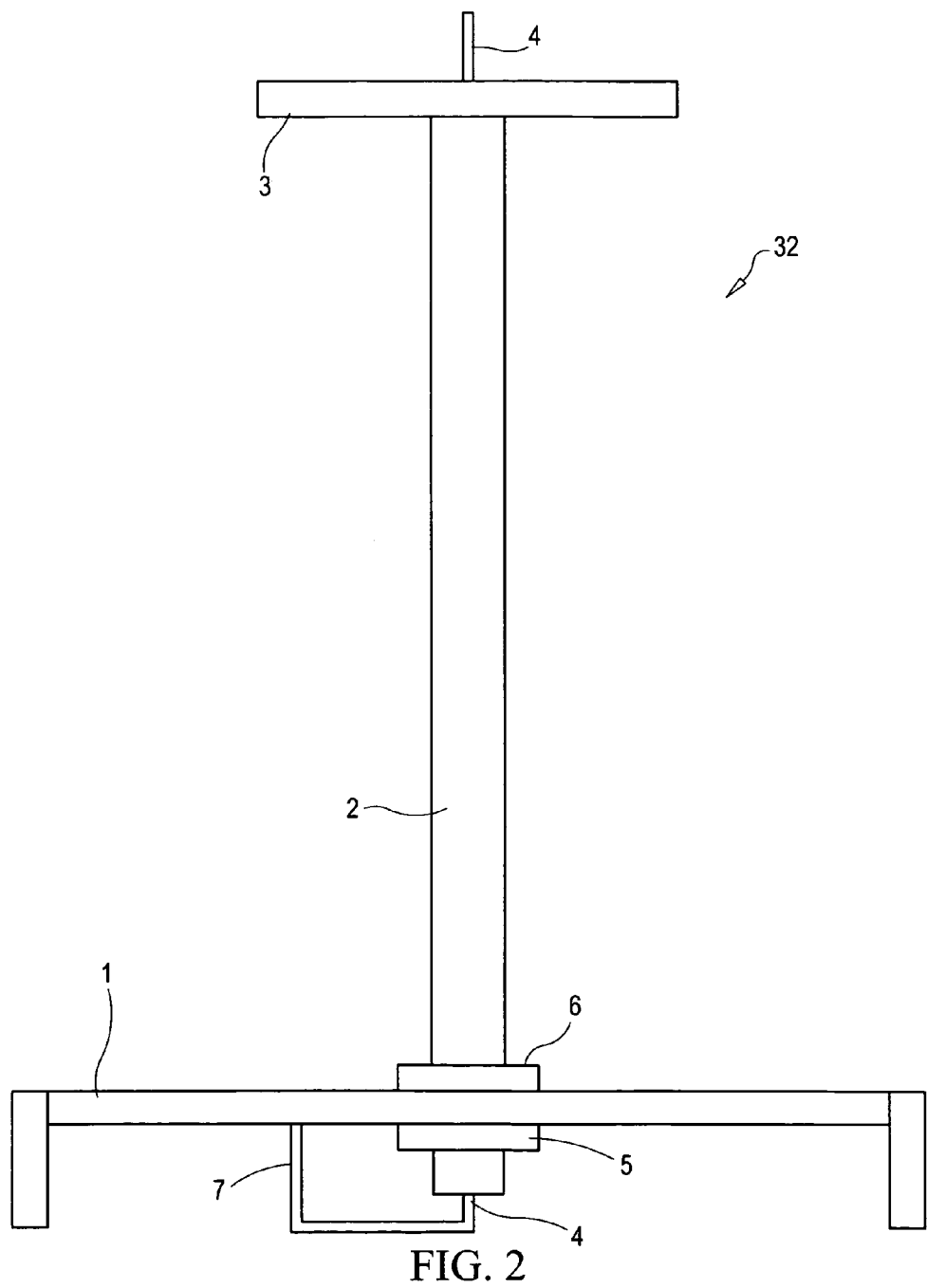
FIG. 2 is an elevation view of an illustrative embodiment of a base assembly.

Referring to FIG. 2, an illustrative embodiment of base assembly 32 is presented. In this embodiment, main shaft 2 transmits mechanical power from rotor assembly 34 (not shown in FIG. 2) to a load (not shown in FIG. 2). Main shaft 2 is preferably hollow and rotates in main shaft lower bearing 5 and main shaft upper bearing 6. Bearings 5 and 6 are preferably mounted on stationary base 1. Main shaft 2 preferably extends above and below stationary base 1. Main shaft hub 3 is preferably mounted on the top of main shaft 1. Stationery rotor azimuth rod 4 does not rotate and is preferably attached to bracket 7 (which is attached to the bottom of stationary base 1) and extends vertically through at least a portion of hollow main shaft 2.

Figure 3:
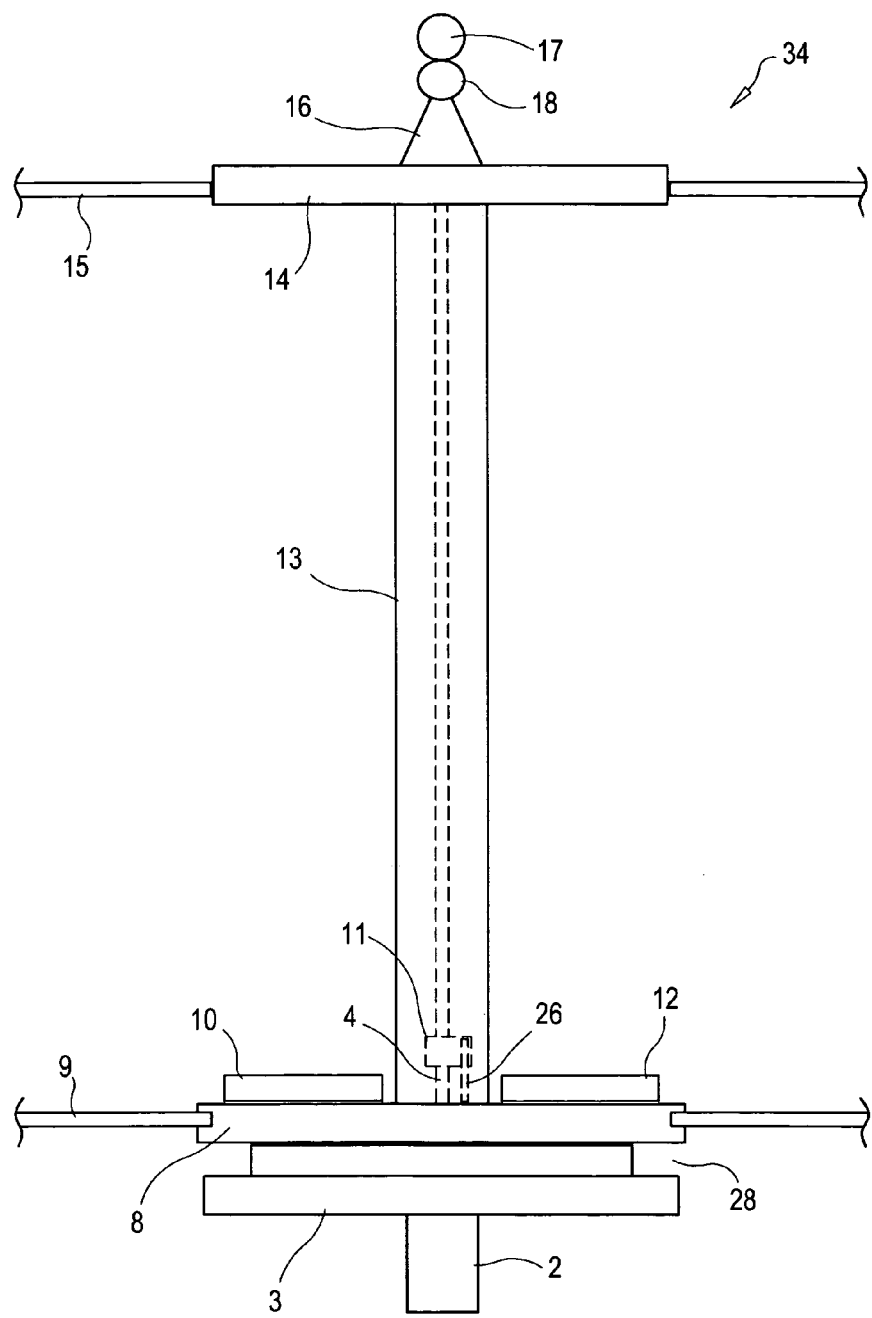
FIG. 3 is an elevation view of an illustrative embodiment of a rotor assembly.

Referring to FIG. 3, an illustrative embodiment of rotor assembly 34 is presented. In this embodiment, main shaft hub 3 is preferably attached to main shaft torque sensor 28 which is attached to lower rotor hub 8. Lower rotor hub 8 preferably rotates clockwise when viewed from above and transmits power to main shaft 2, preferably through main shaft torque sensor 28. Stationery rotor azimuth rod 4 preferably extends above lower rotor hub 8 and is fastened to the input shaft of rotor azimuth sensor 11. The input shaft of azimuth sensor 11 preferably remains stationery while the body of azimuth sensor 11 rotates about it. Rotor azimuth sensor 11 is preferably attached to rotor azimuth sensor bracket 26 which is attached to lower rotor hub 8.

In this embodiment, lower rotor hub 8 preferably also carries control system assembly 10 as well as power supply 12. Thus, everything necessary for data collection and system control is preferably carried on board rotor assembly 34. The only connection of rotor assembly 34 to the ground is preferably via main shaft 2 and stationary rotor azimuth rod 4 inside of it.

Upper rotor hub 14 is preferably mounted on rotor center tube 13 which is hollow and mounted on lower rotor hub 8, enclosing rotor azimuth sensor 11. Sensor mast 16 is preferably mounted on upper hub 14 and both wind azimuth sensor 17 and anemometer wind speed sensor 18 are mounted on sensor mast 16 which rotates with rotor assembly 34.

Sensor mast 16 is preferably always attached to and rotates with upper hub 14. If used, the extension of stationary rod 4 extends up through mast 16 and connects to an input shaft common to both sensors 17 and 18. The bodies of sensors 17 and 18 are preferably fixed to mast 16 and rotate about stationary rod 4. This is the same approach preferably used with sensor 11. The reason is to have the sensor output leads stationary with respect to control system 10. In an illustrative embodiment, electronic hardware (e.g., sensors and computer) and electric motion control hardware (e.g., servo motors) that reside on the rotor are powered via slip rings or induction coil.

Lower wing spoke 9 is preferably attached to lower rotor hub 8 and upper wing spoke 15 is attached to upper rotor hub 14. If a single wing 22 is used, rotor assembly 34 is preferably counterweighted to maintain balance. If a plurality of wings 22 are used, pairs of wings 22 are preferably spaced equally around the circumference of rotor assembly 34. In an alternative embodiment, three wings 22 are used to reduce torque ripple. In yet another alternative embodiment, one mid-wing mounted spoke (not shown) is provided for each wing 22.

Figure 4:
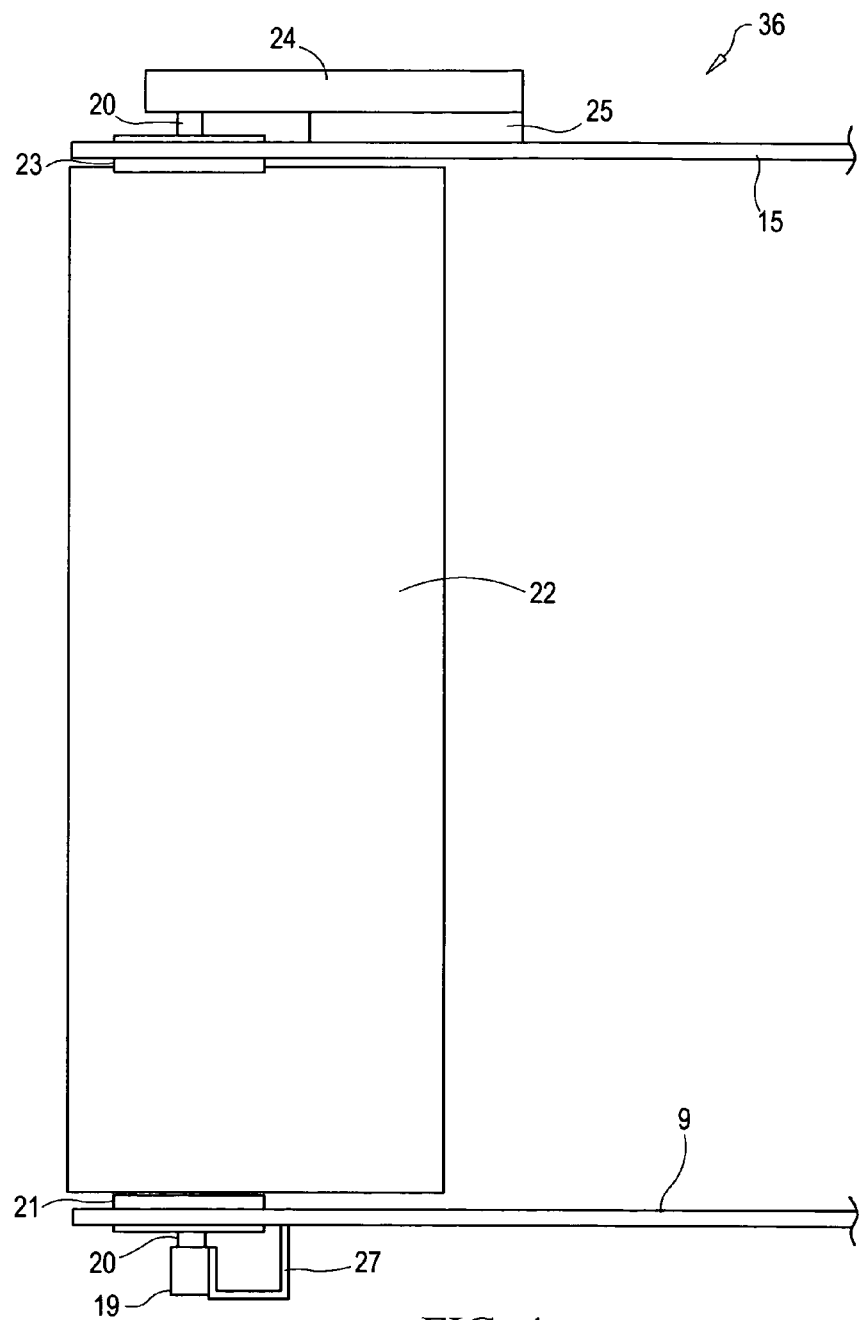
FIG. 4 is an elevation view of an illustrative embodiment of a wing assembly.

Referring to FIG. 4, an illustrative embodiment of wing assembly 36 is presented. In this embodiment, wing 22 preferably surrounds and is fixed to wing tube 20, which rotates in upper wing tube bearing 23 and lower wing tube bearing 21. Wing tube bearings 21 and 23 preferably mount to upper wing spoke 15 and lower wing spoke 9. Each wing 22 is preferably light and strong since it is subject to heavy centripetal loading. Wing rotation mechanism 24, which preferably comprises either a servo motor or a stepper motor, is preferably fixed to wing rotation mechanism mount 25 which is attached to upper wing spoke 15. The output shaft of wing rotation mechanism 24 is preferably attached to wing tube 20 and rotates wing tube 20 according to commands from control system assembly 10. All wing tube rotation is referenced to a wing azimuth degree scale that has a 0 degree mark at right angles to the wing spokes and points in the wing's direction of travel. Wing azimuth sensor 19 is preferably mounted to wing azimuth sensor bracket 27 which is attached to lower wing spoke 9. The input shaft of wing azimuth sensor 19 is preferably attached to wing tube 20 and measures the wing's azimuth with reference to the wing azimuth degree scale.

Figure 5:
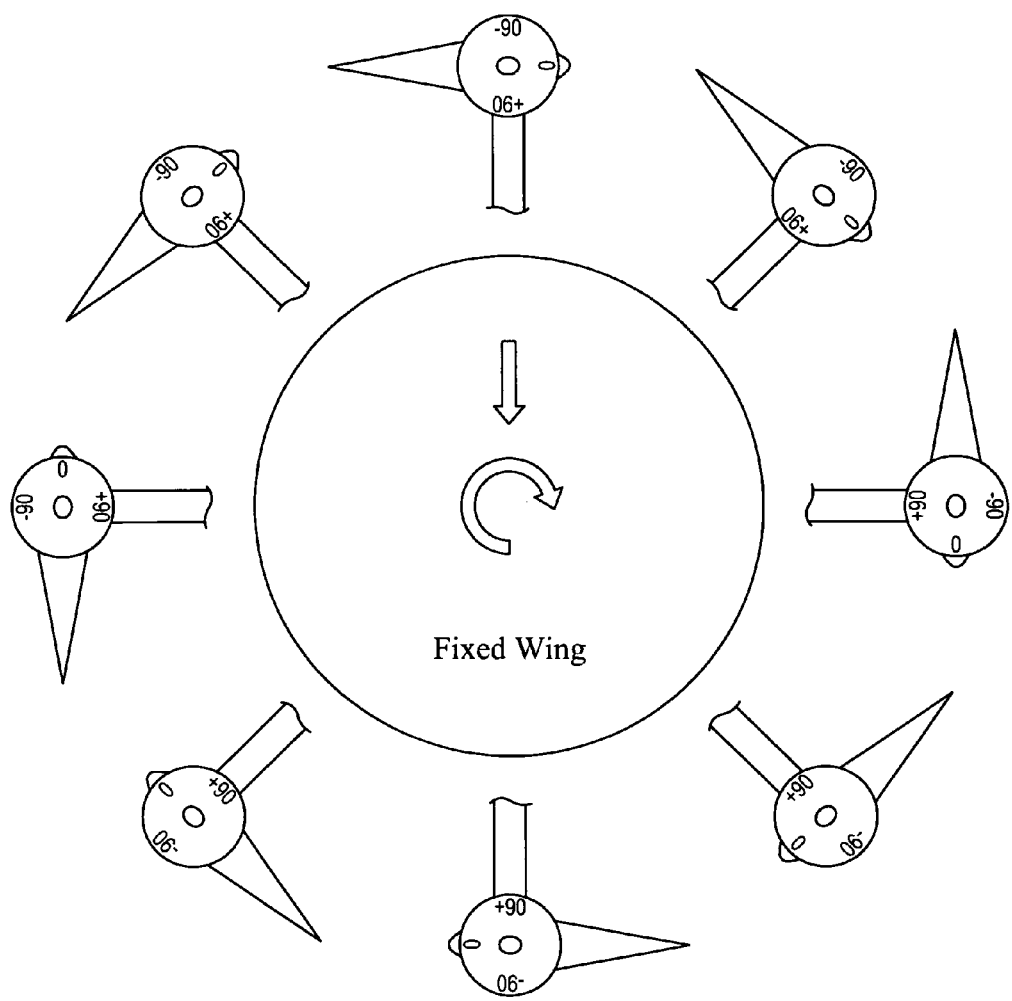
FIG. 5 is a plan (top) view of a single wing shown in eight locations as a background art rotor rotates on a base.
Figure 6:
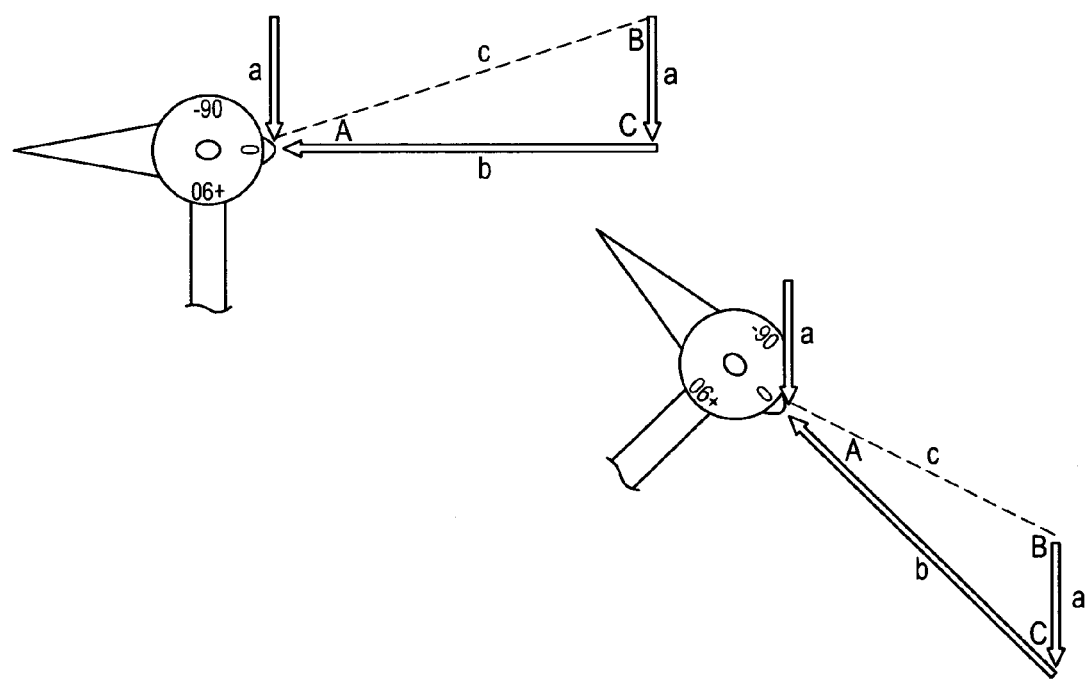
FIG. 6 is a plan view of the single wing of FIG. 5 shown in the first two of the eight locations shown in FIG. 5.
Figure 7:
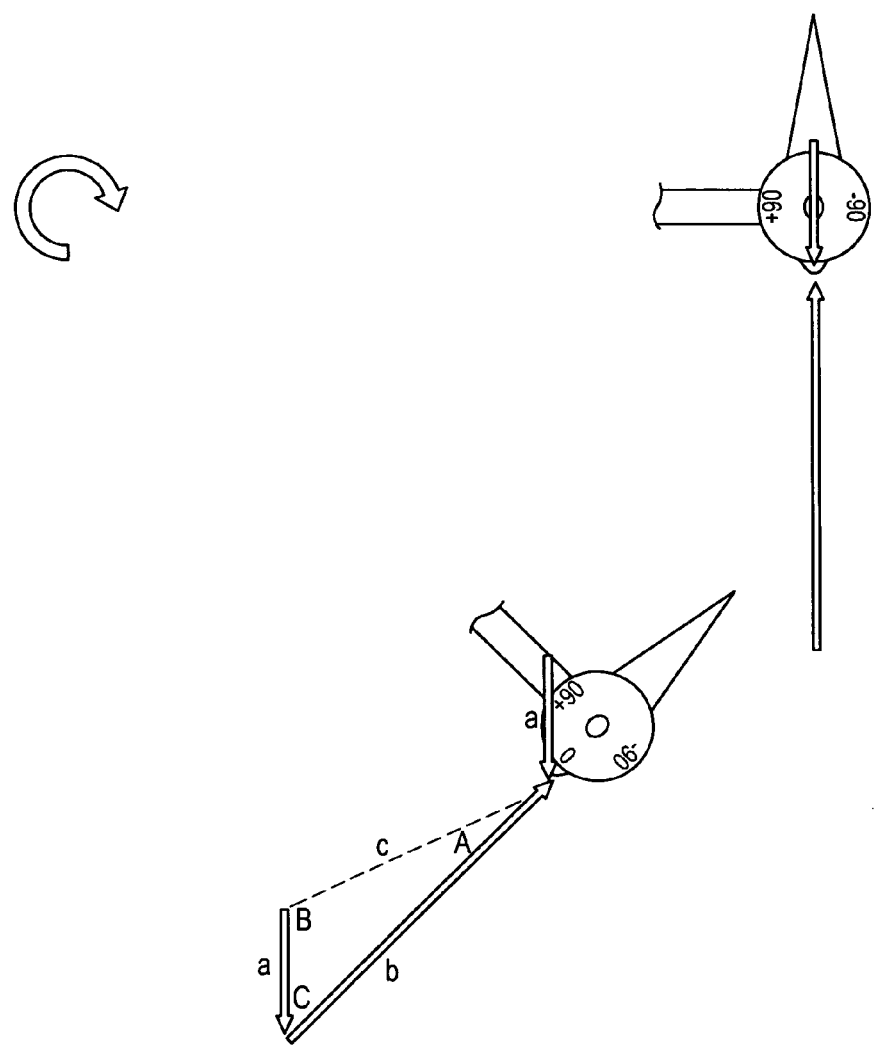
FIG. 7 is a plan view of the single wing of FIG. 5 shown in the second two of the eight locations shown in FIG. 5.
Figure 8:
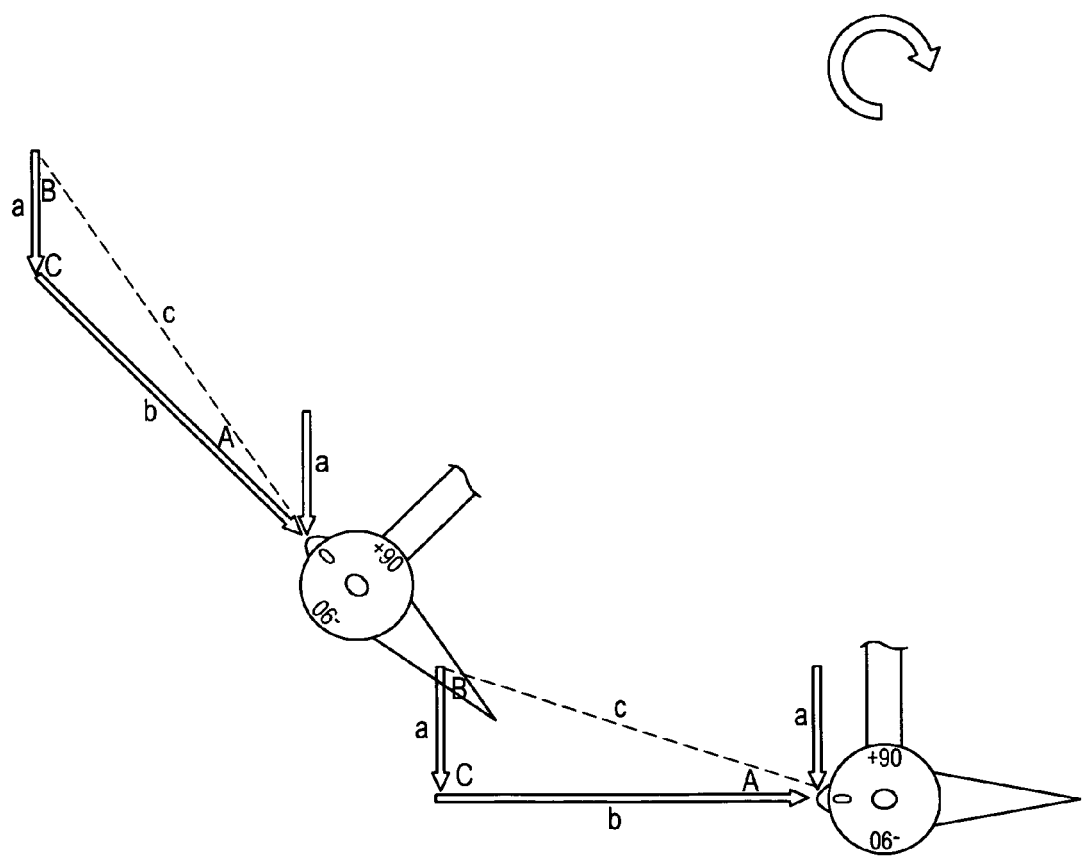
FIG. 8 is a plan view of the single wing of FIG. 5 shown in the third two of the eight locations shown in FIG. 5.
Figure 9:
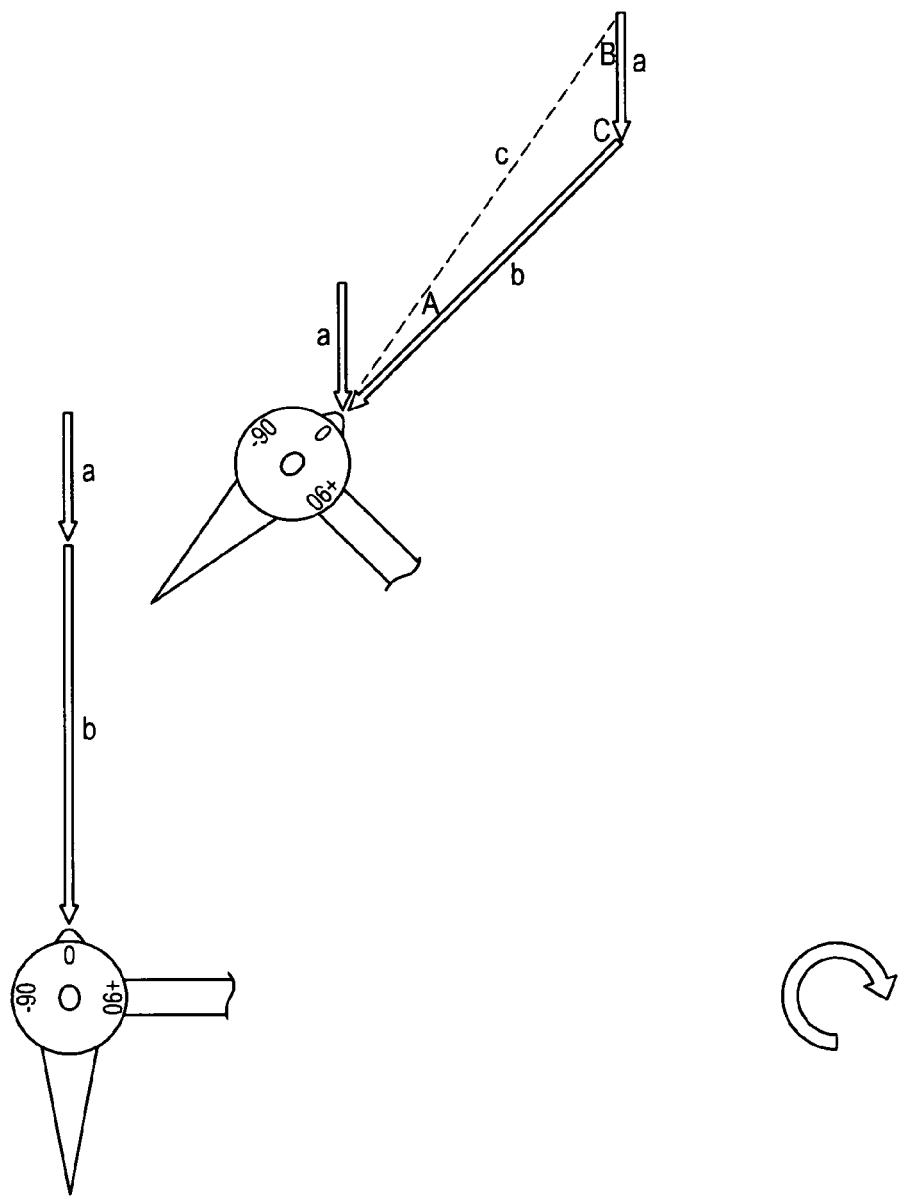
FIG. 9 is a plan view of the single wing of FIG. 5 shown in the fourth two of the eight locations shown in FIG. 5.

Referring to FIG. 5, a top view of a single fixed wing shown in eight locations as a background art rotor rotates on a base is presented. In this view, the fixed wing is exposed to a wind which flows from the top to the bottom of the page. Note that a wing azimuth scale (spoke-tip wing azimuth scale) is fixed to the tip of the spokes at a right angle so that its 0 degree mark faces the spoke tip's direction of travel. This fixed wing does not rotate with respect to the spoke tip, so it does not move from its 0 degree position on the wing azimuth scale. As the rotor is turned and stopped in 45 degree increments, wing 22 is seen to rotate a full 360 degrees on the rotor azimuth scale and zero degrees on the wing azimuth scale. This is a typical background art Darrieus rotor configuration. When the rotor starts turning, however, the wing's speed (and direction) must be added to the measured wind speed (and direction) to determine an "apparent" wind speed and wind direction relative to the moving wing. Apparent wind direction is the reference from which the wing's attack angle is preferably measured. Because the background art wing in FIG. 5 is fixed to the spoke tip and cannot rotate with respect to the spoke tip, in the course of one revolution of the rotor its attack angle to the ever changing apparent wind direction is rarely optimal. The Darrieus rotor has mediocre overall and peak efficiency and does not self-start.

Referring to FIGS. 6-9, the same fixed wing of FIG. 5 is shown in 45 degree increments with respect to the wind, but with the rotor turning such that the wing velocity is three times faster than the wind velocity. This wing is said to have a tip speed ratio of 3. The apparent wind direction is determined by vector addition where angle C is formed by the junction side a wind velocity, and side b wing velocity. Solving for side c using the law of cosines yields the apparent wind velocity side c. Knowing side c, the direction of the apparent wind angle A is determined using the law of sines.

Figure 10:
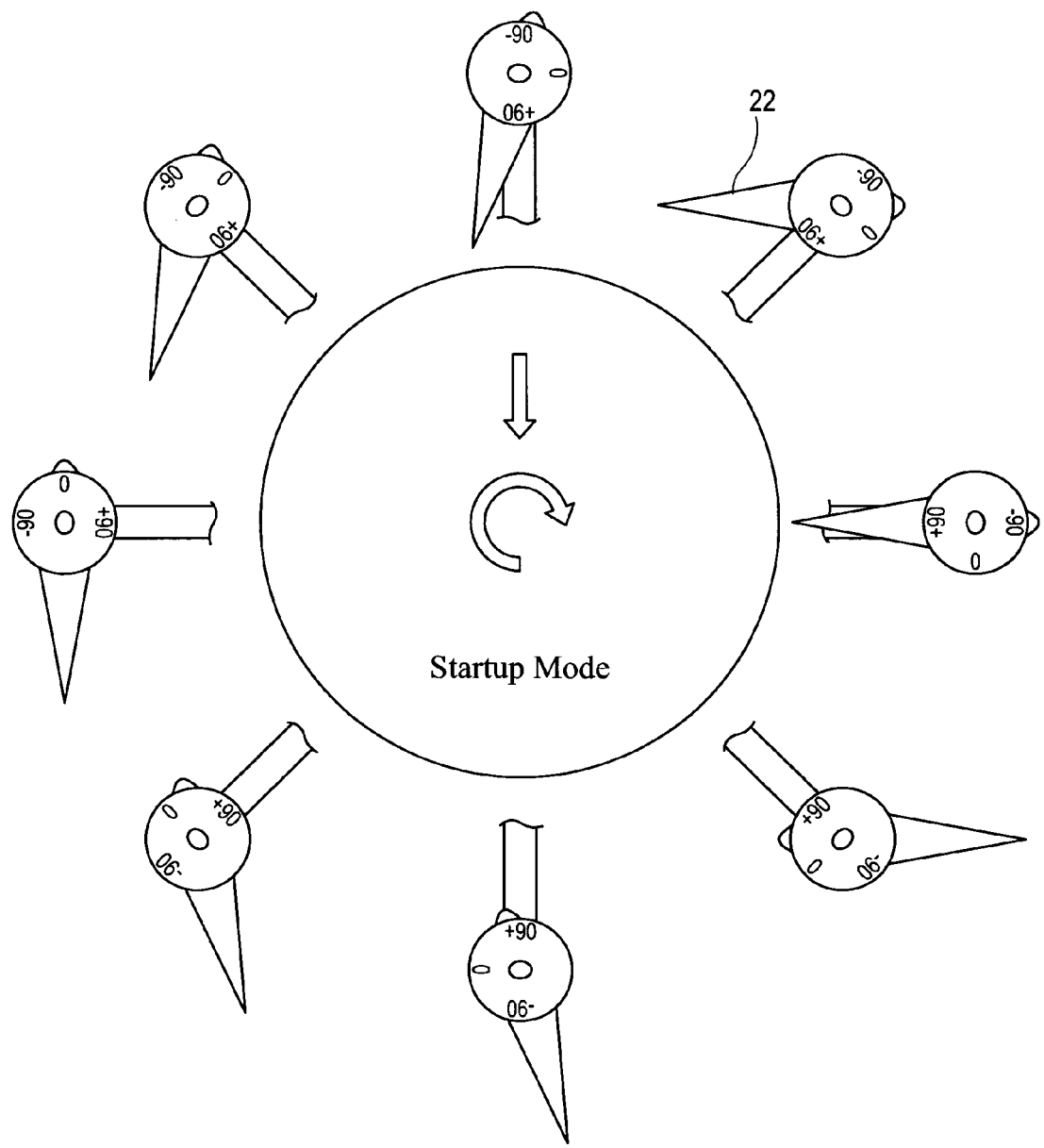
FIG. 10 is a plan view of an illustrative embodiment of the wind turbine in Startup Mode.

Referring to FIG. 10, a plan (top) view of wind turbine 30 operating in Startup Mode is presented. In this view, a single wing variable-pitch wing 22 is shown in eight locations. Wing 22 is exposed to a wind which flows from the top to the bottom of the page. The wing degree scale shown in FIG. 10 has its zero degree mark that faces the direction of travel of the spoke tip. The wing azimuth degree scale is the same as that shown in FIG. 5 (prior art), but the wing's actual azimuth reading on this scale shifts between +90 and −90 degrees as it is rotated by the wing rotation mechanism.

Figure 11:
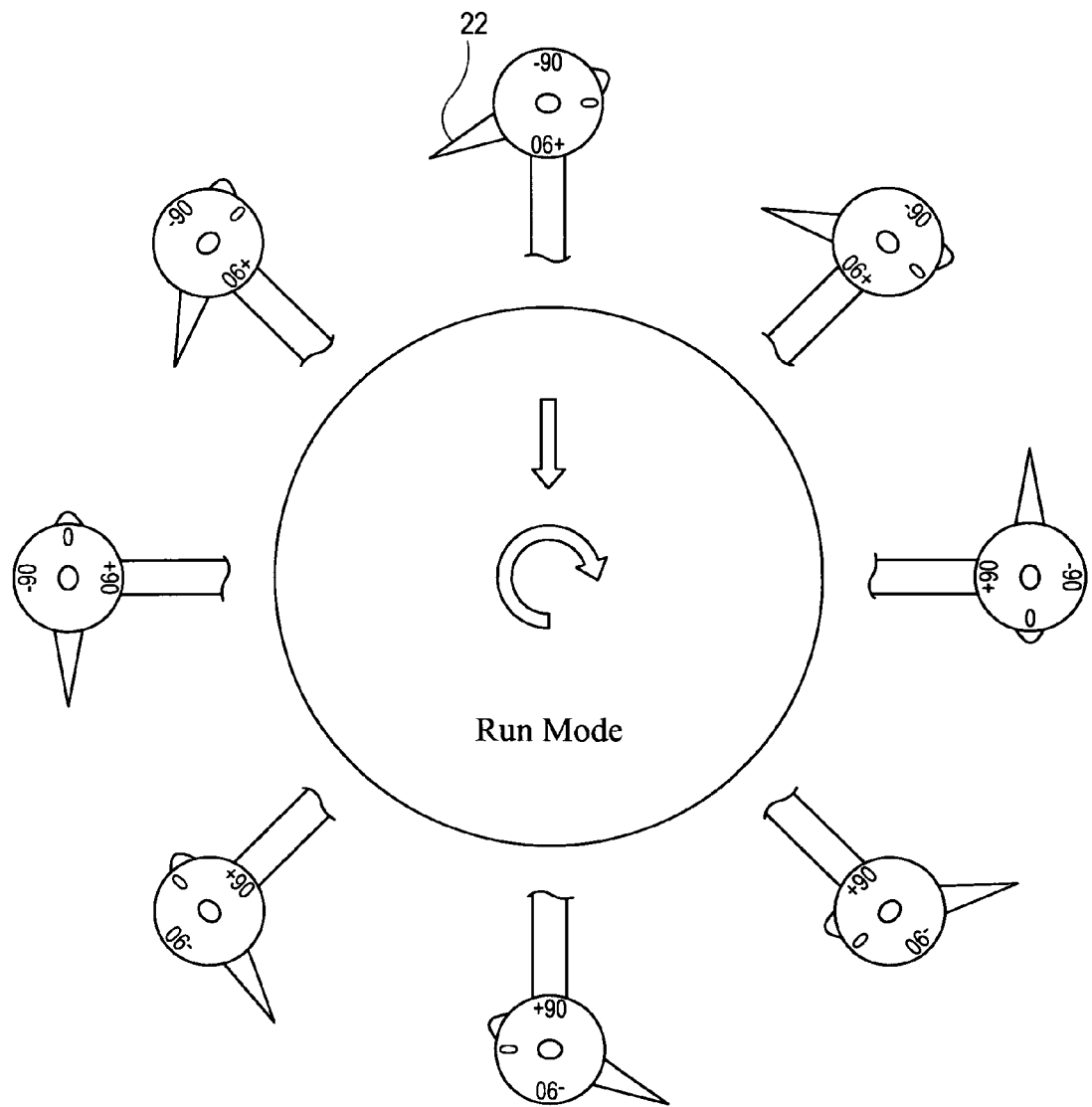
FIG. 11 is a plan view of an illustrative embodiment of the wind turbine in Run Mode with a tip speed ratio of about 2.

Referring to FIG. 11, a plan (top) view of wind turbine 30 operating in Run Mode with a tip speed ratio of about 2 is presented. In this view, a single variable-pitched wing 22 is shown in eight locations. Wing 22 is exposed to a wind which flows from the top to the bottom of the page.

In an illustrative embodiment, operation of wind turbine 30 relies on the following degree scales: (1) a fixed, ground referenced, degree scale for defining the rotor azimuth with its zero degree mark facing North (for consistency with data collected at other wind turbine sites and for no other reason); (2) a fixed, spoke-tip referenced, degree scale for defining the wing azimuth with its zero degree mark facing the spoke-tip's direction of travel; (3) a fixed, rotor-assembly referenced, degree scale for defining each spoke's physical location on rotor assembly 34; and (4) a movable, wind-direction referenced degree scale for defining the wind direction which always has its zero degree mark facing into the instantaneous wind. A person having ordinary skill in the art would understand that these degree scales are preferably not physical objects but rather are mental constructs or internal to transducers In an illustrative embodiment, control system assembly 10 comprises a computer or microcontroller having a memory and processor that is programmed with software instructions that cause wind turbine 30 to step through a control loop in a series of steps. Preferably, this control loop executes at least 50 times a second.

Figure 12:
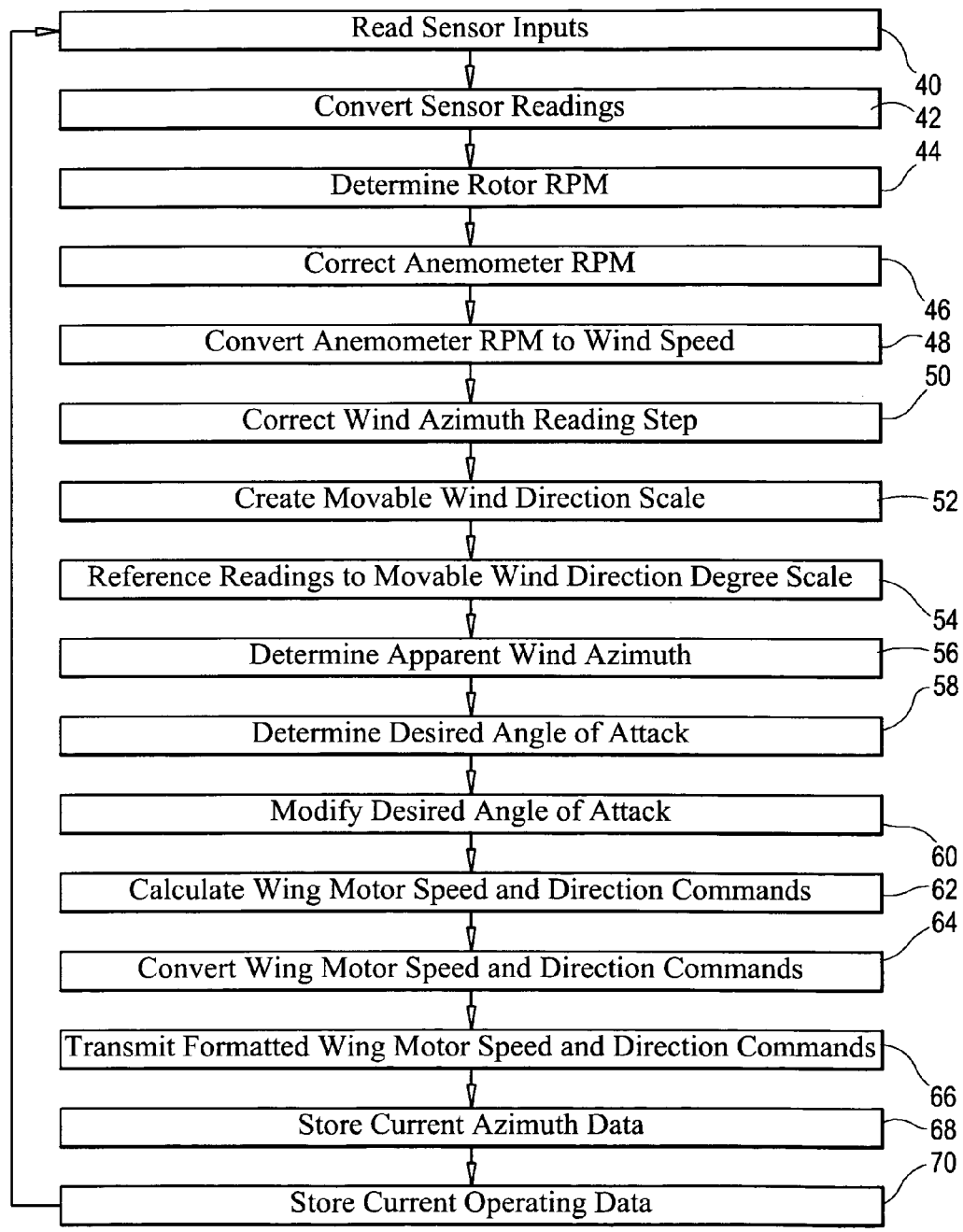
FIG. 12 is a schematic block diagram of a control loop in accordance with an illustrative embodiment of the invention.

Control system assembly 10 is operably connected to the sensors described above. FIG. 12 presents a schematic block diagram of a control loop in accordance with an illustrative embodiment of the invention. In read sensor inputs step 40, the sensor inputs are preferably read from main shaft strain gauge 28, rotor azimuth sensor 11, wind azimuth sensor 17, wind speed sensor 18 and each wing azimuth sensor 19 (that is, as many wing azimuth sensor inputs as there are wings 22).

In convert sensor readings step 42, the sensor inputs are preferably converted into engineering units using offset and gain constants stored in the computer's memory: the input from main shaft strain gauge 28 is converted into a main shaft torque reading on main shaft 2, the input from rotor azimuth sensor 11 is converted into degrees on the ground referenced degree scale, the input from wing azimuth sensor 19 is converted into degrees on the spoke-tip referenced degree scale, the input from wind azimuth sensor 17 is converted to degrees on the rotor referenced degree scale, and the input from wind speed sensor 18 is converted to sensor revolutions per minute (rpm) referenced to the rotor rpm.

In determine rotor rpm step 44, the rotor rpm is preferably determined using its present and previous azimuth readings and the elapsed time and wing speed using rotor rpm and the rotor radius constant stored in memory. These calculated values are filtered as required. At this point in the control loop, the values of the following variables are known: the rotor azimuth referenced to ground, the rotor rpm referenced to ground, the wing azimuth referenced to the spoke-tip based degree scale, the wing speed referenced to ground, the wind azimuth referenced to the rotor degree scale since it mounts on and turns with rotor assembly 34, and the anemometer rpm referenced to the rotor rpm since wind speed sensor 18 is mounted on and turns with rotor assembly 34. These relationships are then manipulated.

In correct anemometer rpm step 46, the anemometer rpm is preferably corrected for the rotor's rpm so that the anemometer rpm is ground referenced. In convert rpm into wind speed step 48, the anemometer rpm is preferably converted into wind speed using the offset and gain constants of wind speed sensor 18. In correct wind azimuth reading step 50, the wind azimuth reading is preferably corrected using the rotor azimuth reading so that the wind azimuth is ground referenced.

In create movable wind direction degree scale step 52, a movable wind direction degree scale is created using the wind azimuth reading. The movable wind direction degree scale is based on a degree scale having a 0 degree mark that faces the wind. With this step accomplished, values produced by readings from sensors mounted on rotor assembly 34 can be referenced to the wind direction by the software in reference readings to movable wind direction degree scale step 54. Thus, in accordance with this embodiment of the invention, the movable wind direction scale is determined by the invention. The wind direction is a real, ground referenced number that is used to substantially instantaneously determine a degree scale that has its 0 degree mark facing into the direction of the wind.

In this embodiment, because the zero degree mark on the movable wind direction degree scale always faces into the current true wind, all software calculations that refer to the movable wind direction degree scale are referenced to the direction from which the wind is blowing, no matter how rapidly or how often the wind is shifting direction. Knowing "instantaneous" sensor readings is one of the keys to optimizing the goal of the invention of achieving a consistently high coefficient of power millisecond by millisecond. A short wing rotation mechanism response time and the timeliness of wind readings are also important. To this end, in an alternative embodiment, air speed sensors are mounted on the wing spokes to get nearer to the wings for greater accuracy. In another alternative embodiment, the air speed sensors are mounted at the spoke tip in order to measure apparent wind directly. A person having ordinary skill in the art would understand that wind tunnel testing could be used to select the optimum location of air speed sensors on wind turbine 30 as well as optimizing many other parameters, e.g., wing attack angles on the downwind half of the rotor assembly.

In an illustrative embodiment, the direction of motion of rotor assembly 34 is clockwise as viewed from above. Wing azimuth readings are preferably referenced to a wing degree scale that is fixed to the end of each spoke such that its zero degree mark faces the spoke's direction of travel, i.e., it is tangential to the circumference of the circle described by motion of the spoke tip. In this embodiment, 90 degrees is added to the fixed spoke position on the movable wind direction degree scale to obtain its direction of travel (and the wing's direction of travel) with reference to the wind direction. The wing degree scale is preferably divided so that rotating wing tube 20 in the zero to +180 degree range points the leading edge of wing 22 toward the center of rotor assembly 34, and rotating wing tube 20 in the zero to −180 degree range points the leading edge of wing 22 away from the center of rotor assembly 34. Thus, at this point in the control loop, the following are referenced to ground: wind speed is referenced to ground via rotor rpm, and wind direction on the wing azimuth scale is referenced to ground via the wind's direction on the wing azimuth scale via the movable wind direction degree scale via the rotor azimuth. FIGS. 6-9 all show the wings fixed at the zero degree position on the wind azimuth scale.

With the wind velocity and wing velocity now both referenced to the wing azimuth scale, vector addition is preferably used to determine the apparent wind azimuth on the wing azimuth degree scale in determine apparent wind azimuth step 56. The nomenclature used in this determination (and illustrated in FIGS. 6-9) is as follows:

Side a=wind speed
Side b=wing speed
Side c=apparent wind speed
Angle A=apparent wind direction on the wing degree scale
Angle C=the supplement of the angle formed by the wind to the wing's direction of travel (always zero degrees on the wing azimuth scale).

In this embodiment, vector addition is preferably performed as follows: determine side c using the law of cosines: $c^2=a^2+b^2-(2*a*b*\cos(C))$ and determine angle A using side c and the law of sines: $a/\sin(A)=c/\sin(C)$. This angle is the azimuth of the apparent wind as read on the wing azimuth degree scale. The apparent wind azimuth (relative wind direction) referenced to the wing azimuth scale is now known.

In alternative embodiments, other approaches to solving the apparent wind triangle use an airspeed sensor (anemometer) located near the end of a wing spoke, (one sensor for each wing), and a wind direction sensor is not involved. With a two-wing rotor, wing spoke anemometers are used to measure the instantaneous apparent wind speed. In the course of one rotor revolution, any given wing has a maximum apparent wind speed anemometer reading as it moves upwind, and a minimum one as it moves downwind. The difference of these two readings divided by two is the true wind speed. With a two wing rotor, two simultaneous pairs of maximum/minimum readings are generated during each rotor revolution. Therefore, each wind speed reading is updated every one half rotor revolution. The greater the number of wings, the more frequently the updates are preferably generated.

In this embodiment, all three sides of the apparent wind triangle are known: side a=true wind speed, side b=wing speed, and side c=apparent wind speed, if the latest updated true wind speed is always used for side a. Using the law of cosines, when the lengths of three sides of a triangle are known, the apparent wind triangle may be solved for angle A.

In another embodiment, angle A is determined using spoke anemometers. In this case true wind speed is determined as just described, but in addition, the azimuth (direction) of the true wind speed is determined as well. In the course of a single rotor revolution, the apparent wind speed at any given wing varies in a sinusoidal way. At higher TSRs, for example, above 5, the sinusoidal wave looks very much like a real sine wave, but at lower TSRs, for example under 3, the sinusoidal wave is quite lopsided: The rate of change of the apparent wind speed is quite slow as the wing anemometer passes through its maximum reading on the upwind side of its travel. The opposite is true as the wing anemometer passes through its minimum reading on the downwind side of its travel. The rate of change of the apparent wind speed is quite rapid, which makes the calculation of its minimum speed much more accurate than calculations using the maximum reading. In one embodiment, the minimum speed calculation is good enough to assume that at this point the true wind is blowing from directly behind the wing. If so, true wind direction becomes known, which, in combination with the already known true wind speed, allows one to solve the apparent wind triangle for angle A using the same technique as described in the applicant's provisional patent application cited above.

In determine desired angle of attack step 58, the desired attack angle of each wing 22 is preferably determined (referenced to the wing azimuth scale) using the apparent wind azimuth and the wing's maximum lift attack angle constant (usually between 12-16 degrees) stored in memory. The current rotor rpm and the desired (setpoint) rotor rpm are then used to degrade the desired angle of attack as needed using motion control algorithms to maintain the setpoint rotor rpm. If the rotor is operating below the setpoint rpm, the maximum lift attack angle is used.

In another illustrative embodiment, wind turbine 30 comprises the following rotary position transducers to measure angular divisions of a circle for use in the apparent wind triangle: one rotor azimuth transducer 11; one true wind azimuth transducer 17; and one wing azimuth transducer 19 for each wing (as many transducers as there are wings). In this embodiment, all rotary position transducers are installed and aligned as indicated below.

In this embodiment, rotor azimuth transducer 11 is connected to moving rotor 34 and to the ground and preferably measures the angle the rotor makes to the North Pole (true North). Rotor azimuth transducer 11 is preferably installed and aligned so that when spoke number 1, (a designated rotor reference spoke), points to true North, the output of rotor azimuth transducer 11 indicates 0 degrees (or radians or any other units, as long as it is a measurement of angle). A person having ordinary skill in the art would understand that any other reference direction (e.g., true South) could be used for all transducers referenced to a reference direction.

In this embodiment, true wind azimuth transducer 17 is connected to the moving rotor 34 and to a moving vane (preferably a part of wind direction sensor) that is exposed to the free wind, and measures the angle the wind vane makes to the designated rotor reference spoke of rotor 34. The moving vane is preferably installed and aligned so that when the designated rotor reference spoke of rotor 34 points to true North and the wind vane points to true North, the output of true wind azimuth transducer 17 indicates 0 degrees of angle.

In this embodiment, each wing's wing azimuth transducer 19 is connected to a rotor spoke and a wing that rotates with respect to the rotor spoke, and measures the angle the wing chord makes to the wing spoke. Each wing's wing azimuth transducer 19 is installed and aligned so that when the wing's leading edge is pointed in the same direction as the spoke tip's direction of motion, the output of the wing azimuth transducer 19 indicates 0 degrees of angle.

Referring again to FIG. 12, in this embodiment, step 50 can be described as reference rotor azimuth reading to wind azimuth transducer step 50 and step 54 can be described as reference readings to each wing azimuth sensor step 54. Step 52 is not necessary in this embodiment.

Figure 13A:
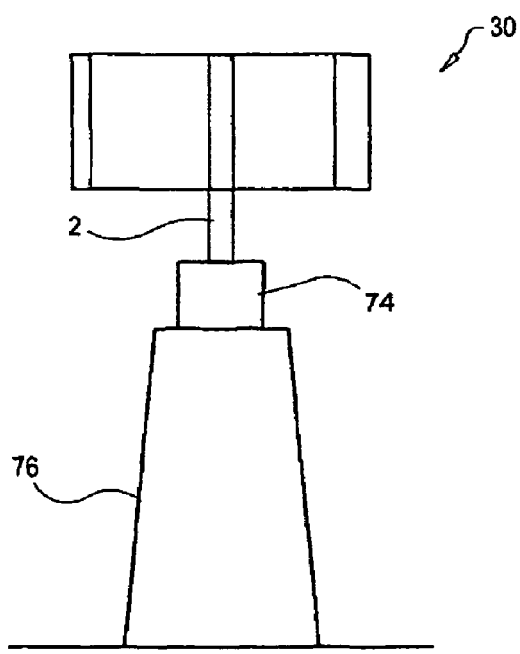
FIG. 13A is a view of the wind turbine placed on a tower.
Figure 13B:
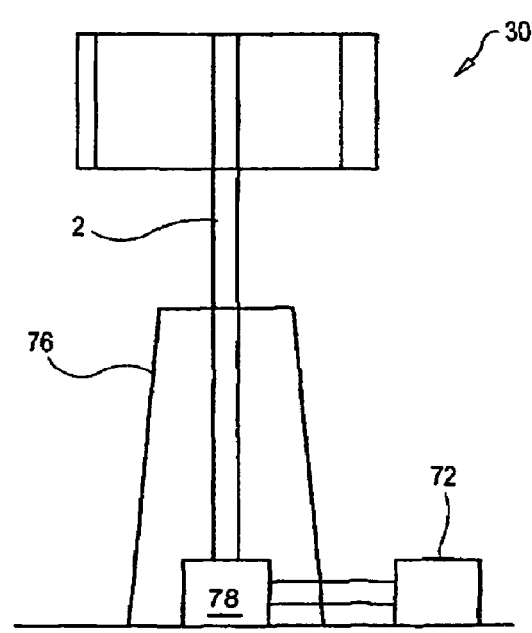
FIG. 13B is a view of a wind turbine attached to a transmission.

Referring to FIGS. 13A and 13B, other illustrative embodiments of vertical wind turbine 30 are presented. In these embodiments, vertical wind turbine 30 further comprises: a generator that is attached to main shaft 2. Preferably, the generator is selected from the group consisting of: speed increasing transmission 78 connected to high speed, brushless, rectified alternating current, indirect drive generator 72 mounted beside tower 76; and low speed, axial flux, brushless, rectified alternating current, direct drive generator 74 mounted at the top of tower 76 and beneath rotor assembly 34. Preferably, the generator is driven directly by the rotor's main shaft 2.

A person having ordinary skill in the art would understand that a wing, when it creates lift, always does so at right angles to its apparent wind direction. When a wing 22 is mounted on the circumference of a hub, a component of the lift it creates pulls it around this circumference. Since the wing is attached to a spoke on a hub, torque is created on the hub's main shaft as the wing pulls itself around in a circle. At any particular instant this torque bears a direct relationship to the wing's lift, and since lift is controlled by attack angle, software can be used to control the main shaft torque: more attack angle, more torque; less attack angle, less torque. If the wing is placed in stall with too great an attack angle, negative torque (braking) is created. This approach is preferably used to prevent over speeding in higher winds with a light load. In general, while one would expect wind turbine 30 to operate with its wings at maximum lift attack angles almost all the time, wind turbine 30 is a flexible prime mover, and rapidly adjusts itself by means of its software to varying loads.

If the tip speed ratio is below about 1.1 (or another value determined via wind tunnel testing), in modify desired angle of attack step 60, the desired angle of attack is preferably modified so that each wing 22 with a movable wind direction degree scale azimuth of more than 0 degrees or less than 180 degrees is oriented at an attack angle that puts it at a right angle to the wind. This procedure is called "Startup Mode" and uses each wing 22 traveling downwind as a drag device and each wing 22 traveling upwind as a lift device to render wind turbine 30 self-starting. Once rotor assembly 34 is moving, and the tip speed ratio is above 1.1, wind turbine 30 defaults to "Run Mode." In Run Mode, wind turbine 30 is preferably always a lift device.

In calculate wing motor speed and direction commands step 62, the wing rotation mechanism (e.g., servo motor, stepper motor, etc.) speed (rpm) and direction (clockwise or counterclockwise) command is preferably calculated using the previous wing azimuth (stored in memory), the current wing azimuth from wind azimuth sensor 19, and the desired wing azimuth (based on the desired angle of attack), using industry standard motion control algorithms and strategies [e.g., Proportional-Integral-Derivative (PID) controller, velocity feed forward, etc.]

In convert wing motor speed and direction commands step 64, the speed command is preferably converted into a pulse width modulation (PWM) command format such that full speed counter-clockwise equals a pulse width of 1.0 milliseconds, 0 speed=1.5 milliseconds, and full speed clockwise=2.0 milliseconds. A person having ordinary skill in the art would understand that other command formats may be used.

In transmit formatted wing motor speed and direction commands step 66, the PWM command is preferably sent to the servo speed controller hardware which converts the command into an appropriate plus/minus voltage to operate each wing rotation mechanism. In store current azimuth data step 68, the current wing azimuth and the current rotor azimuth are preferably stored in the memory for use in the next pass through the control loop. In store current operating data step 70, current operating data such as wing azimuth, main shaft torque, rotor rpm, and wind speed and direction, etc. are preferably stored in the memory for download and analysis later. At this point, the control loop is preferably repeated.

Timely software control of the angle of attack and hence lift (or drag if desired) of each wing 22, provides significant advantages. Since wind turbine 30 preferably regulates its own rotational speed regardless of load, it continues to produce usable power in higher winds. Thus, it will never overdrive the load and force it to shut down. In addition, if wind turbine 30 is under heavy load in a higher wind, and that load suddenly disappears, nothing adverse would happen. Wind turbine 30 would not exceed a maximum safe speed, but rather it would continue to hold (or go up to and hold) its setpoint rpm. The normal emergency shut down protections used by all wind turbines in higher winds would also be used.

When testing an embodiment of wind turbine 30 having more than one wing, the software can make a wing "disappear" during part of each revolution of the rotor assembly by keeping the wing pointed into the apparent wind so that it creates no lift and the software can make the wing "reappear" at another place in the cycle. This allows the measurement of the wing's performance during a particular segment of a single revolution (e.g., the front side and the back side of rotor assembly 34 with respect to the wind), as well as the relationships the wings have to each other and the airflow through wind turbine 30 in this airflow environment. When the wing travels about its circular path, it passes through the wind twice. The first pass (pass 1) occurs on the upwind side of the rotor and the wing sees undisturbed air. The second pass (pass 2) occurs on the downwind side of the rotor and the wing sees disturbed air. A person having ordinary skill in the art would understand that the relationships between a wing's pass 1 angle of attack and its effect on power available in the disturbed air to the wing in pass 2 can be explored in a wind tunnel. With this information, reducing a wing's lift in pass 1 to improve the wing's lift in pass 2 to produce a net gain is used in some alternative embodiments. In other alternative embodiments, wind turbine 30 incorporates non-symmetrical wing shapes, for example, wings with camber. In one embodiment, the wing's lift is maximized in pass 1 and, ignoring lift altogether, the wing's drag is minimized in pass 2.

An illustrative wing shape for wing 22 is the well-studied NACA 0016 airfoil. Since the wing on a VAWT uses both of its surfaces to generate lift (one surface when it is on the upwind side of the rotor assembly, and the other surface when it is on the downwind side of the rotor assembly), airfoils that have a symmetrical profile on both sides of their chord line are particularly preferred. In an alternative embodiment, a wing with camber (a non-symmetrical profile about the chord line) is used. In another alternative embodiment, a wing with flaps, as well as an attack angle, under computer control is preferred.

Betz' law, which says that 16/27 or 59.3 percent of the wind's energy is the most a turbine can extract from the wind, assumes the rotor is a two-dimensional disk. This assumption is fairly correct for a horizontal axis wind turbine (HAWT) propeller, but is not at all correct for a VAWT. The applicant believes that it may be possible that some energy is being added to the air flow into the center space of the rotor between wing pass 1 and wing pass 2. This suggests that the theoretical efficiency of a VAWT might be higher than Betz' law indicates.

Many variations of the invention will occur to those skilled in the art. Some variations include mounting a wind azimuth and/or a wind speed sensor at the end of each spoke. Other variations call for reliance on a single wind azimuth and/or a single wind speed sensor. All such variations are intended to be within the scope and spirit of the invention.

Although some embodiments are shown to include certain features, the applicant specifically contemplates that any feature disclosed herein may be used together or in combination with any other feature on any embodiment of the invention. It is also contemplated that any feature may be specifically excluded from any embodiment of the invention.

What is claimed is:

1. A vertical axis wind turbine for extracting energy from wind having a direction, said vertical axis wind turbine comprising:
    a tower;
    a shaft that is mounted in said tower;
    a rotor assembly that is attached to said shaft, said rotor assembly comprising at least one spoke;
    at least one wing or blade that is pivotably attached to each said at least one spoke, each at least one wing or blade having a chord line and an angle of attack and being operative to generate lift;
    at least one servomotor, each said at least one servomotor being attached to each said at least one wing or blade and to each said at least one spoke and being operative to adjust the orientation of each said at least one wing or blade relative to said at least one spoke;
    a plurality of sensors that measure a wind direction, a wind speed, a direction of said at least one wing or blade, a speed of said at least one wing or blade, a rotor assembly position and a rotor assembly speed and produce output signals; and
    a computer that is operative to iteratively accept said output signals, calculate an apparent wind direction, and send an input signal to each said at least one servomotor to change said angle of attack of each said at least one wing or blade so as to maximize the power output of the vertical axis wind turbine;
    wherein said angle of attack is an angle between said chord line and the said apparent wind direction.

2. The vertical axis wind turbine of claim 1 further comprising:
    more than one said wing or blade; and
    more than one said servomotor.

3. The vertical axis wind turbine of claim 1 wherein said computer is operative to accept said output signals and send said input signal at least 50 times per second.

4. The vertical axis wind turbine of claim 1 further comprising:
    at least two spokes;
    wherein each said at least one wing is supported at its top and at its bottom by one of said at least two spokes and each said at least one servomotor is disposed adjacent either at said top or said bottom.

5. The vertical axis wind turbine of claim 1 wherein each said at least one wing is supported at its midpoint by a single spoke and each said at least one servomotor is disposed adjacent said midpoint.

6. The vertical axis wind turbine of claim 1 further comprising:
    a slip ring or an induction coil for transmitting power to each said servomotor and said computer.

7. The vertical axis wind turbine of claim 1 wherein each said at least one servomotor is a right angle gear head servomotor or a stepper motor.

8. The vertical axis wind turbine of claim 1 further comprising:
    a generator that is attached to said shaft.

9. The vertical axis wind turbine of claim 8 wherein said generator is selected from the group consisting of:
    a high speed, brushless, rectified alternating current, indirect drive generator with a speed increasing transmission mounted beside said tower; and
    a low speed, axial flux, brushless, rectified alternating current, direct drive generator mounted at the top of said tower and beneath said rotor assembly.

10. The vertical axis wind turbine of claim 1 further comprising:
    a power supply, said power supply supplying power to each said at least one servomotor.

11. The vertical axis wind turbine of claim 10 wherein said power supply is selected from the group consisting of:
    a chemical battery; and
    a capacitor.

12. The vertical axis wind turbine of claim 1 wherein said plurality of sensors comprises a wind speed sensor that is selected from the group consisting of:
    a tachometer generator with a revolutions per minute output;
    an analog, non-contacting anemometer with a first position output;
    a digital, non-contacting anemometer with a second position output;
    a hot wire, analog anemometer with a speed output; and
    an ultrasonic analog or digital anemometer with a speed output.

13. The vertical axis wind turbine of claim 1 wherein said plurality of sensors comprises a wind speed sensor that is located on a rotating or non-rotating mast that is disposed above said rotor assembly, on a rotating or non-rotating hub that is attached to said tower beneath said rotor assembly, or on said at least one spoke or an extension to said at least one spoke.

14. The vertical axis wind turbine of claim 1 wherein said plurality of sensors comprises a wind speed sensor that receives regulated operating power from said computer.

15. The vertical axis wind turbine of claim 1 wherein said plurality of sensors comprises a wind azimuth sensor that is selected from the group consisting of:
    an analog, non-contacting wind azimuth sensor with a first position output; and
    a digital, non-contacting wind azimuth sensor with a second position output.

16. The vertical axis wind turbine of claim 1 wherein said plurality of sensors comprises a wind azimuth sensor that is located on a rotating or non-rotating mast that is disposed above said rotor assembly, on a rotating or non-rotating hub that is attached to said tower beneath said rotor assembly, or on said at least one spoke or an extension to said at least one spoke.

17. The vertical axis wind turbine of claim 1 wherein said plurality of sensors comprises a wind azimuth sensor that receives regulated operating power from said computer.

18. The vertical axis wind turbine of claim 1 wherein said plurality of sensors comprises a rotor azimuth sensor that is selected from the group consisting of:
- an analog, non-contacting rotor azimuth sensor with a first position output; and
- a digital, non-contacting rotor azimuth sensor with a second position output.

19. The vertical axis wind turbine of claim 1 wherein said plurality of sensors comprises a rotor azimuth sensor that is located on said rotor assembly with an input shaft attached to said tower or in said tower.

20. The vertical axis wind turbine of claim 1 wherein said plurality of sensors comprises a rotor azimuth sensor that receives regulated operating power from said computer.

21. The vertical axis wind turbine of claim 1 wherein said plurality of sensors comprises a wing azimuth sensor that is selected from the group consisting of:
- an analog, non-contacting wing azimuth sensor with a first position output; and
- a digital, non-contacting wing azimuth sensor with a second position output.

22. The vertical axis wind turbine of claim 1 wherein said plurality of sensors comprises a wing azimuth sensor that is located on said at least one spoke.

23. The vertical axis wind turbine of claim 1 wherein said plurality of sensors comprises a wing azimuth sensor that receives regulated operating power from said computer.

24. The vertical axis wind turbine of claim 10 further comprising:
- a wing motor controller/driver that is associated with each at least one wing that receives power from said power supply.

25. The vertical axis wind turbine of claim 1 wherein said computer is a microcomputer or a microcontroller.

26. A vertical axis wind turbine for extracting energy from wind having a direction, said vertical axis wind turbine comprising:
- a tower;
- a shaft that is mounted in said tower;
- a rotor assembly that is attached to said shaft, said rotor assembly comprising a plurality of spokes;
- a wing that is pivotably attached to each of said spokes, each said wing having a chord line and an angle of attack and being operative to generate lift;
- each said wing and each of said spokes having a servomotor attached thereto, each said servomotor being operative to adjust the orientation of said wing relative to said spoke;
- a plurality of sensors that measure a wind direction, a wind speed, a direction of said at least one wing, a speed of said at least one wing, a rotor assembly position and a rotor assembly speed and produce output signals; and
- a computer that is operative to iteratively accept said output signals, calculate an apparent wind direction, and send an input signal to each said servomotor to change said angle of attack of each said wing so as to maximize the power output of the vertical axis wind turbine;
- wherein said angle of attack is an angle between said chord line and an apparent wind direction.

* * * * *